United States Patent
Povinelli et al.

(10) Patent No.: US 10,589,803 B2
(45) Date of Patent: Mar. 17, 2020

(54) DEPLOYABLE AERODYNAMIC BED COVER SYSTEM

(71) Applicant: Magna Exteriors Inc., Concord (CA)

(72) Inventors: Anthony J. Povinelli, Romeo, MI (US); Martin R. Matthews, Troy, MI (US)

(73) Assignee: Magna Exteriors Inc., Concord (CA)

( * ) Notice: Subject to any disclaimer, the term of this patent is extended or adjusted under 35 U.S.C. 154(b) by 51 days.

(21) Appl. No.: 15/954,894

(22) Filed: Apr. 17, 2018

(65) Prior Publication Data

US 2018/0237082 A1 Aug. 23, 2018

Related U.S. Application Data

(62) Division of application No. 15/128,042, filed as application No. PCT/US2015/021661 on Mar. 20, 2015, now Pat. No. 10,005,501.

(Continued)

(51) Int. Cl.
*B60P 7/02* (2006.01)
*B62D 35/00* (2006.01)
(Continued)

(52) U.S. Cl.
CPC ............ *B62D 35/007* (2013.01); *B60J 7/041* (2013.01); *B60J 7/0573* (2013.01); *B60J 7/141* (2013.01);
(Continued)

(58) Field of Classification Search
CPC ...... B60R 2021/23382; B60R 21/2338; B60R 21/233; B60R 21/2165; B60R 3/02;
(Continued)

(56) References Cited

U.S. PATENT DOCUMENTS 4,506,870 A * 3/1985 Penn .................. B62D 33/0273
296/180.1
4,585,263 A * 4/1986 Hesner ................ B62D 35/007
296/180.1
(Continued)

FOREIGN PATENT DOCUMENTS

CN 1444516 A 9/2003
CN 103612590 A 3/2014
(Continued)

OTHER PUBLICATIONS

Adem, F.A., "Drag Reduction of Pickup Truck Using Add-On Devices," California State University, Sacramento (2009) pp. 48-96.
(Continued)

*Primary Examiner* — Kiran B Patel
(74) *Attorney, Agent, or Firm* — Warn Partners, P.C.

(57) ABSTRACT

An active bed cover system having at least one deployable panel and at least one actuator. The deployable panel extends and retracts based on vehicle requirements and provides reduction in vehicle drag, thereby reducing emissions and improving fuel economy. Additionally, it allows for the system to retract within the tailgate and/or cargo bed liner allowing for access to the bed and improved usability and aesthetics. The active bed cover provides a fully deployable system with object detection, declutching of the actuator to help prevent damage, and communication with the vehicle to determine proper deployment and function.

15 Claims, 14 Drawing Sheets

Related U.S. Application Data

(60) Provisional application No. 61/968,438, filed on Mar. 21, 2014.

(51) Int. Cl.

| | | |
|---|---|---|
| *B60J 7/14* | (2006.01) | |
| *B62D 33/027* | (2006.01) | |
| *B60J 7/04* | (2006.01) | |
| *B60J 7/057* | (2006.01) | |
| *B60J 7/16* | (2006.01) | |
| *B62D 33/03* | (2006.01) | |

(52) U.S. Cl.
 CPC ........ *B60J 7/1621* (2013.01); *B62D 33/0273* (2013.01); *B62D 33/03* (2013.01); *B62D 35/001* (2013.01)

(58) Field of Classification Search
 CPC ......... B60R 9/00; B62D 33/0273; B60P 3/40; B60P 1/435
 See application file for complete search history.

(56) References Cited

U.S. PATENT DOCUMENTS

| | | | |
|---|---|---|---|
| 4,810,022 A | | 3/1989 | Takagi et al. |
| 4,863,213 A | | 9/1989 | Deaver et al. |
| 4,884,838 A | * | 12/1989 | Slater ................ B62D 33/0273 296/180.1 |
| 4,938,398 A | * | 7/1990 | Hallsen ..................... B60R 9/00 224/404 |
| 5,069,498 A | * | 12/1991 | Benchoff ............. B62D 35/001 296/180.1 |
| 5,083,829 A | * | 1/1992 | Fonseca ............... B62D 35/001 224/404 |
| 5,232,259 A | * | 8/1993 | Booker .................. B60R 11/06 224/404 |
| 5,234,249 A | * | 8/1993 | Dorrell .............. B62D 33/0273 296/180.1 |
| 5,435,616 A | * | 7/1995 | Corner ............... B62D 33/0273 296/180.1 |
| 5,722,714 A | * | 3/1998 | Vallerand ........... B62D 33/0273 296/180.1 |
| 5,735,567 A | * | 4/1998 | Mora, Sr. ............. B62D 35/007 296/180.1 |
| 5,743,589 A | * | 4/1998 | Felker ................ B62D 33/0273 296/180.5 |
| 5,826,932 A | * | 10/1998 | DeSimone ................ B60P 3/40 296/57.1 |
| 5,941,588 A | * | 8/1999 | Marconi ............ B62D 33/0273 296/26.11 |
| 6,120,076 A | * | 9/2000 | Adsit ........................ B60P 3/40 296/26.11 |
| 6,193,294 B1 | * | 2/2001 | Disner ............... B62D 33/0273 108/44 |
| 6,322,221 B1 | | 11/2001 | van de Loo |
| 6,325,448 B1 | | 12/2001 | Estrada et al. |
| 6,631,938 B1 | * | 10/2003 | Burns ....................... B60P 3/36 296/64 |
| 6,712,423 B2 | * | 3/2004 | Lehmann ........... B62D 33/0273 296/180.1 |
| 6,729,680 B2 | | 5/2004 | Lehmann |
| 6,908,139 B1 | | 6/2005 | Szieff |
| 6,962,388 B1 | * | 11/2005 | Flores ................ B62D 33/0273 296/180.1 |
| 6,991,277 B1 | * | 1/2006 | Esler ....................... B60P 1/435 296/26.08 |
| 7,021,689 B1 | * | 4/2006 | Weisbeck, III .... B62D 33/0273 296/26.11 |
| 7,090,287 B1 | * | 8/2006 | Eberst ................ B62D 33/0273 296/180.1 |
| 7,182,395 B2 | | 2/2007 | Lehmann |
| 7,374,299 B2 | | 5/2008 | Brouwer et al. |
| 7,878,576 B1 | | 2/2011 | Embler |
| 8,109,552 B2 | * | 2/2012 | Nelson ............... B62D 33/0273 224/403 |
| 8,281,967 B2 | | 10/2012 | Evans |
| 8,366,284 B2 | | 2/2013 | Flynn et al. |
| 8,727,424 B1 | * | 5/2014 | Nelson ................. B62D 35/001 296/180.1 |
| 9,452,793 B1 | * | 9/2016 | Quick ................ B62D 33/0273 |
| 10,214,250 B2 | * | 2/2019 | Hemphill .................. B60R 3/02 |
| 10,399,615 B2 | * | 9/2019 | Williams .................. F15D 1/12 |
| 2002/0053813 A1 | * | 5/2002 | Wilde ........................ B60J 1/20 296/180.1 |
| 2002/0121794 A1 | * | 9/2002 | Vejnar ................ B62D 33/0273 296/50 |
| 2002/0163222 A1 | * | 11/2002 | Lehmann ........... B62D 33/0273 296/180.1 |
| 2002/0163223 A1 | * | 11/2002 | Lehmann ........... B62D 33/0273 296/180.1 |
| 2006/0043769 A1 | * | 3/2006 | Lehmann ........... B62D 33/0273 296/180.1 |
| 2006/0214449 A1 | * | 9/2006 | Klusmeier ......... B62D 33/0273 296/26.11 |
| 2007/0284904 A1 | * | 12/2007 | Carvalho ................ B60P 1/431 296/57.1 |
| 2008/0048465 A1 | * | 2/2008 | Hawley .............. B62D 33/0273 296/26.11 |
| 2008/0315623 A1 | * | 12/2008 | Khalighi ............ B62D 33/0273 296/180.5 |
| 2009/0250962 A1 | * | 10/2009 | Polewarczyk ........... B60P 7/14 296/57.1 |
| 2010/0026027 A1 | * | 2/2010 | Gao .................... B62D 33/0273 296/26.11 |
| 2010/0078955 A1 | * | 4/2010 | Smith ................. B62D 25/2054 296/26.11 |
| 2013/0049395 A1 | * | 2/2013 | Poirier ..................... B60R 5/041 296/37.6 |
| 2014/0084626 A1 | * | 3/2014 | Hori .......................... B60S 1/58 296/180.5 |
| 2014/0333083 A1 | * | 11/2014 | Bzoza ...................... B60R 5/041 296/26.11 |
| 2015/0291017 A1 | * | 10/2015 | LaBiche .................. B60J 7/141 296/100.09 |
| 2016/0200260 A1 | * | 7/2016 | Faruque ............... B62D 33/027 296/37.6 |
| 2016/0280123 A1 | * | 9/2016 | Rohr ........................ B60J 7/068 |
| 2016/0280125 A1 | * | 9/2016 | Delcharco .................. B60J 7/10 |

FOREIGN PATENT DOCUMENTS

| | | |
|---|---|---|
| DE | 19509568 C1 | 8/1996 |
| DE | 10233747 A1 | 2/2004 |
| DE | 102012018465 A1 | 3/2013 |
| EP | 0802348 A2 | 10/1997 |
| EP | 1594212 A2 | 11/2005 |
| EP | 1755923 A1 | 2/2007 |
| GB | 616119 A | 1/1949 |
| WO | 2014205217 A1 | 12/2014 |

OTHER PUBLICATIONS

Maxwell, T., Jones, J. and Jones, W., "Pickup Truck Drag Reduction-Devices that Reduce Drag Without Limiting Truck Utility," SAE Technical Paper 881874 (1988) doi: 10.4271/881874.

"GMC Pickups 101: Busting Myths of Truck Aerodynamics," http://media.gm.com/media/us/en/gm/news.detail.html/content/Pages/news/us/en/2013/May/0516-gmc-pickup-aero.html, May 16, 2013, retrieved Mar. 1, 2017.

International Search Report for International Application No. PCT/US2015/021661, dated Jun. 10, 2015.

International Search Report for International Application No. PCT/US2014/043185, dated Oct. 7, 2014.

* cited by examiner

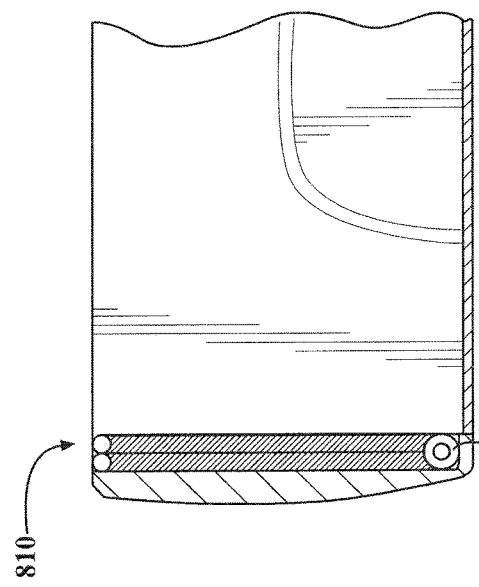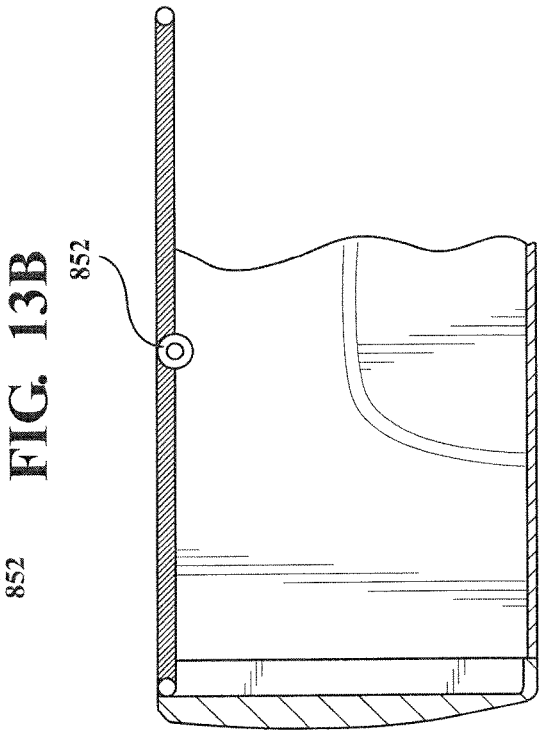

DEPLOYABLE AERODYNAMIC BED COVER SYSTEM

CROSS-REFERENCE TO RELATED APPLICATIONS

This application is a Divisional of U.S. patent application Ser. No. 15/128,042, filed Sep. 21, 2016, which is a National Stage of International Application No. PCT/US2015/021661, filed Mar. 20, 2015, which claims priority to U.S. Provisional Patent Application No. 61/968,438 filed Mar. 21, 2014 The disclosures of the above applications are incorporated herein by reference.

FIELD OF THE INVENTION

The present invention relates to an active bed cover assembly integrated into a tailgate system and/or cargo bed area for automotive applications.

BACKGROUND OF THE INVENTION

There has been increasing desire to manufacture vehicles that meet or exceed environmental improvement requirements. However, there is a considerable loss of aerodynamic efficiency in vehicles, in particular, pickup trucks and other vehicles having a storage bed, due to the airflow into the bed and over the tailgate.

Therefore, having parts with improved aerodynamics has become a well-received option typically effective toward helping to advance standards such as mileage requirements. There are also several other factors that must be considered including aerodynamic load, part weight, cost, complexity and durability.

Typical systems, such as fixed panels, or motorized deployable panels, do not meet requirements. Known systems do not have a proper sealed and clutchable actuator with communication capability and life cycle durability, object detection, are not transparent to the vehicle when the tailgate is down, and are not durable and aerodynamically effective. Conventional systems also have the potential to break or be damaged due to sliding objects in the pickup cargo bed. Typical systems also do not have the ability to detect objects in the event there is cargo/objects in the way during deployment.

Accordingly, there remains a need in the art to provide an automatically deployable structure under predetermined conditions that provides improved arodynamics.

SUMMARY OF THE INVENTION

The present invention is directed to an active bed cover assembly having at least one deployable panel that moves between at least a stowed position and a deployed position driven by at least one actuator, such as a sealed, clutchable actuator that has communication capability with the vehicle. The deployable panel improves arodynamics and is part of a tailgate system/module and/or cargo bed lining that allows for a smooth, functional surface when the tailgate is down and does not limit access to the pickup bed or the available footprint. The assembly does not require manual deployment and is only utilized when necessary; at predetermined vehicle speeds under predetermined conditions with no bed cargo interference.

When the deployable panel is in an extended or deployed position, the deployable panel improves airflow under predetermined conditions, e.g., vehicle speeds in the range of at least 30 miles per hour. When the deployable panel is in a retracted or stowed position, the deployable panel generally folds or otherwise moves out of the way within the tailgate and/or bed liner of the vehicle to improve pickup cargo bed clearance when the tailgate is down and prevent damage due to sliding objects in the pickup bed when the tailgate is up or down. The active bed cover assembly provides a fully deployable system with object detection, declutching to help prevent damage, e.g., to protect the deployable panel under higher predetermined loads, is flush when stowed for bed access and usability, has communication with the vehicle to determine proper deployment and function, and is suitable to meet automotive specifications and functionality.

Utilization of the bed cover system that deploys and retracts based on vehicle requirements provides valueable reduction in vehicle drag, thereby reducing emissions and improving fuel economy. Additionally, it allows for the system to retract into the tailgate system/module/frame/bed liner so the vehicle can still meet cargo bed requirements and reduce or eliminate potential for damage due to sliding objects in the pickup bed.

BRIEF DESCRIPTION OF THE DRAWINGS

The present invention will become more fully understood from the detailed description and the accompanying drawings, wherein:

FIG. 13A is a perspective view of a tailgate assembly with an active bed cover assembly including an integrated folding panel shown in a deployed position, in accordance with an eighth embodiment of the present invention;

FIG. 13B is a broken-away side view of the cover assembly of FIG. 13A illustrating the folding panel in a stowed position;

FIG. 13C is a broken-away side view of the assembly of FIG. 13A illustrating pivotal movement of the folding panel from a stowed position toward the deployed position;

FIG. 13D is a broken-away side view of the assembly of FIG. 13A illustrating the folding panel in the deployed position;

DETAILED DESCRIPTION OF THE PREFERRED EMBODIMENTS

The following description of the preferred embodiment(s) is merely exemplary in nature and is in no way intended to limit the invention, its application, or uses.

Figure 1:
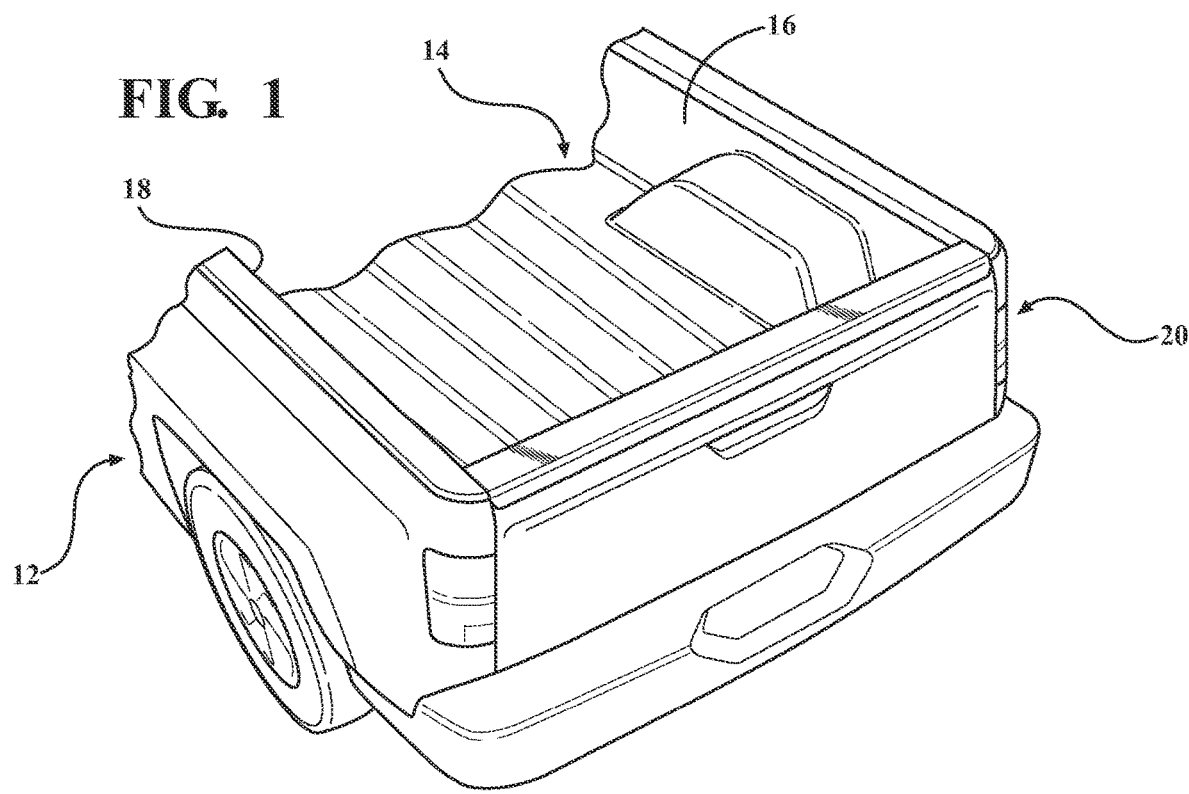
FIG. 1 is a perspective view of a vehicle with a tailgate assembly in a closed position.
Figure 2:
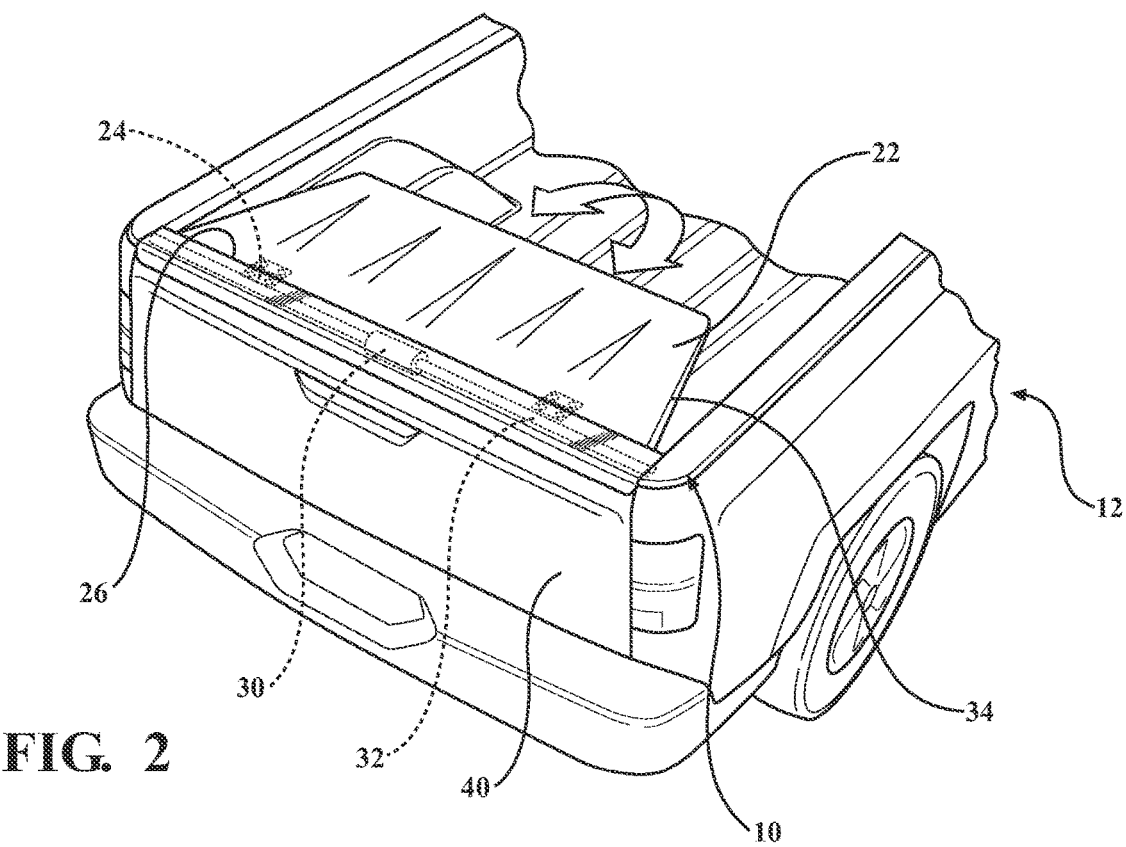
FIG. 2 is a perspective view of the vehicle tailgate assembly incorporated with an active bed cover assembly shown in a deployed position, in accordance with one embodiment of the present invention.
Figure 3:
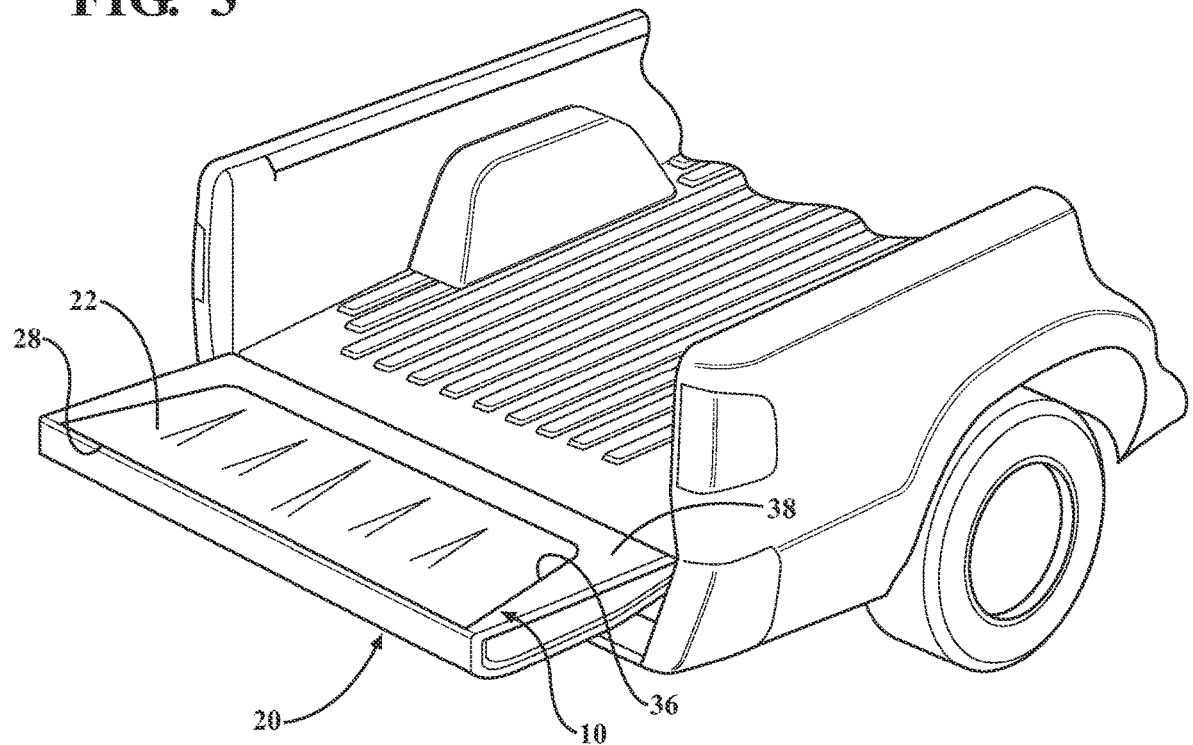
FIG. 3 is a perspective view of the vehicle tailgate assembly of FIG. 2 in an open position and the active bed cover assembly in a stowed position.

Referring to FIGS. 1-3 generally, in accordance with the present invention, there is provided an active bed cover assembly generally shown at 10 for a vehicle 12. The vehicle 12 includes a cargo bed generally indicated at 14 with side walls 16, 18, and a tailgate assembly generally shown at 20.

The active bed cover assembly 10 includes at least one deployable panel 22 rotatably connected to the vehicle 12. Typically, the panel 22 is moveable between at least a deployed position and a stowed position. However, depending on the application the deployable panel 22 is slidable, extendable, articulatable, stackable, pivotable, rollable, elevatable, inflatable, foldable, combinations thereof or otherwise connected and deployable in the cargo bed 14 area depending on the application.

A pair of hinges 24 are connected toward an upper edge 26 of the tailgate 20 to the first end 28 of the deployable panel 22. The panel 22 is adapted for attachment to the pair of hinges 24 which can be any hinge arrangement suitable for predetermined cycling and durability requirements. Typically, the upper edge 26 region has a 'U' shaped cross-section, cutout or notch and each hinge is fastened in the region, e.g., directly or by way of a fastener or pin going through diverging side walls of the cutout. However, depending on the application hinges are bolted, screwed, welded, riveted, secured with adhesive and/or epoxy, combinations thereof or otherwise connected to the panel 22 and tailgate 20 and/or side walls 16, 18 depending on the application. Alternatively, molded-in panel features which are used to attach to opposing vehicle features and/or in combination with at least one fastener for each hinge or the like may be used to pivotally secure the panel 22 to the vehicle 12 and allow deployment of the panel 22.

At least one actuator 30 is connected to a respective drive shaft 32 operably coupled to the deployable panel 22 and embedded within the tailgate 20 to flip the panel 22 up/down. Typically, the actuator 30 and drive shaft 32 are enclosed within the tailgate assembly 20 between an inner panel 38 and an outer panel 40 of the tailgate 20, generally centrally located toward the upper end of the tailgate 20 (See FIG. 3 indicated in phantom). Preferably, one actuator 30 and a single driving rotating shaft is used and rotates the panel 22 up/down. Optionally, access panels may be provided for servicing and maintenance of the actuating arrangement.

The actuator 30 rotates the drive shaft 32 to drive the panel 22 upward during deployment of the panel 22 to the deployed position (see FIG. 2). When the active bed cover assembly 10 is in the extended/up or deployed position, the deployable panel 22 improves airflow.

The actuator 30 also rotates the drive shaft 32 in the opposite direction to move the panel 22 downward out of the way to the stowed position. When the active bed cover assembly 10 is in the retracted/down or stowed position, the deployable panel 22 nests within a depression 36 or recess having a predetermined depth formed into the inner panel 38 of the tailgate 20 which depression is sized to receive the full panel 22 within the depression 36. Thus, whether the tailgate assembly 20 is in the closed or open position (FIG. 3 open position) the stowed panel 22 is substantially flush to the inner panel 38 allowing for a smooth, functional surface when the tailgate 20 is down, helping to prevent damage to the stowed panel 22 from sliding or moving cargo, and does not limit access to the pickup bed or the available footprint.

The actuator 30 is a rotary actuator, e.g., with feedback options, hex-type, screw-type drive, higher speed actuator, electric, mechanical, linear, e.g., with current override circuits, declutching, hydraulic, pneumatic, extending, power lift actuator, or any other actuators and combinations thereof depending on the application and predetermined vehicle needs.

In a preferred embodiment, the actuator 30 has internal clutching that reacts to certain conditions by de-clutching or disengages gears allowing the deployable panel 22 to stop deployment to help prevent damage to the active deployable panel 22. Upon impact to the deployable panel 22, e.g., by a sliding object in the pickup bed, the actuator 30 will clutch to disengage the gearing so that the deployable panel 22 can move freely out of the way. The actuator 30 itself does not move out of the way upon impact to the deployable panel 22. In the event there is cargo/objects in the way during deployment of the panel 22, the actuator 30 can clutch to disengage the gearing or the actuator 30 can retract the deployable panel 22 back to the stowed position. Typically, the actuator 30 senses current spikes and causes the actuator 30 to react to certain conditions, e.g., sensing of objects in the cargo bed hitting the deployable panel 22 induces the actuator 30 to disengage the gearing.

The actuator 30 is typically sealed and has communication capability with the vehicle 12. The actuator 30 and the vehicle 12 also communicate to deploy and retract the deployable panel 22 based upon predetermined conditions such as vehicle speed, wind direction, e.g., average wind direction is unfavorably about 5° yaw, etc. By way of example, the deployable panel 22 is embedded in the tailgate 20 of the vehicle 12 and when the vehicle 12 reaches a predetermined speed, e.g., about 30-40 mph, the deployable panel 22 folds upward to the deployed position and stays up until the vehicle drops back down to below the predetermined speed or other predetermined conditions for continued deployment are no longer met.

When the deployable panel 22 is up in the deployed position it is extended to partially cover the vehicle bed 14. Generally, covering about one third to one half of the cargo bed. Typically, covering less than one third of the cargo bed. Preferably, extending 6 inches to 30 inches. More preferably, extending at least 22 inches. Most preferably, extending about 30 inches.

When the deployable panel 22 is up in the deployed position it is generally between the side walls 16, 18 extending horizontally. Accordingly, the deployable panel 22 extends generally flat along the same plane as the top of the side walls 16, 18 of the cargo bed 14, and prevent air from swirling within the storage bed and reduce drag. Alternatively, the panel 22 is angled up, e.g., generally, zero to 60 degrees over horizontal, typically, five to thirty degrees over horizontal, preferably, fifteen to thirty degrees over horizontal, most preferably, five to fifteen degrees maximum over horizontal. In accordance with a most preferred embodiment, the panel 22 is not at an angle when in the deployed position.

When the deployable panel 22 is up in the deployed position it is possible to angle the panel 22 with the cargo load in the cargo bed 14, e.g., about 85 to 90 degrees, without departing from the scope of the invention.

The sides 34 of the formed panel 22 are angled with the proximal end of the panel 22 being widest.

Figure 4:
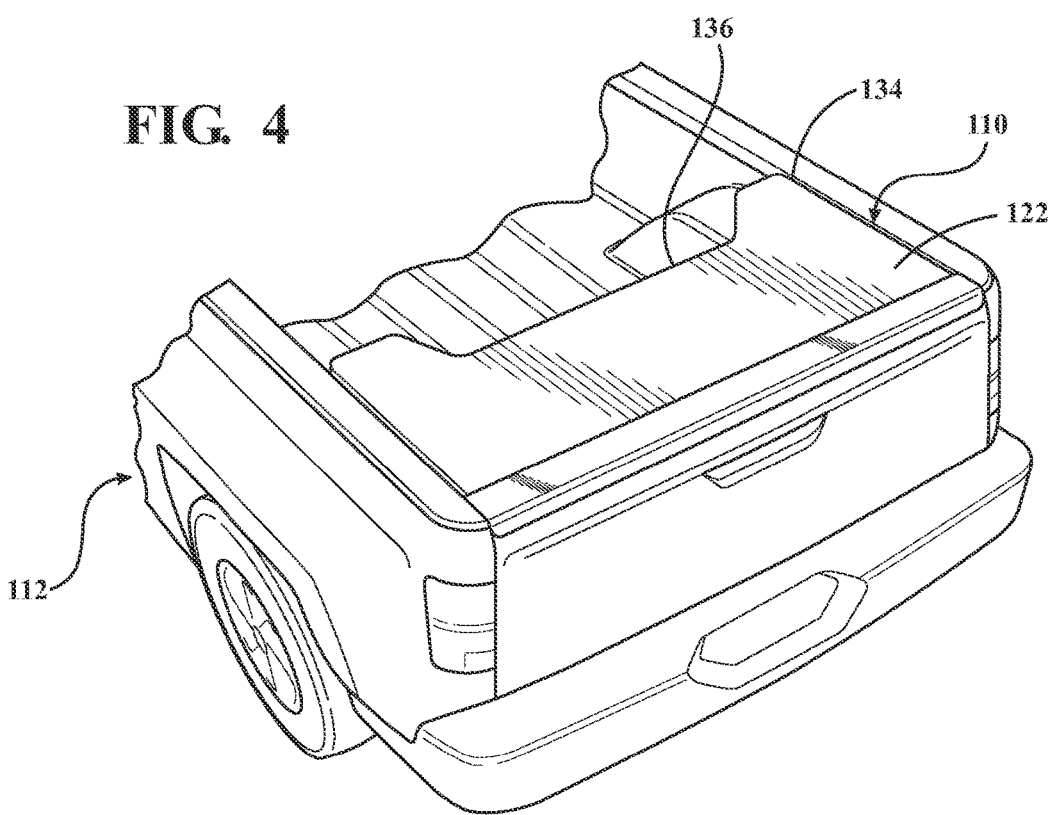
FIG. 4 is a perspective view of the vehicle tailgate assembly incorporated with an active bed cover assembly shown in a deployed position, in accordance with another embodiment of the present invention.

Referring to FIG. 4 generally, in accordance with another embodiment of the present invention, an active bed cover assembly generally shown at 110 for a vehicle 112 is identical to the first embodiment except that the deployable panel 122 as a different profile. The sides 134 are substantially straight and a cutout 136 is located along the leading edge of the panel 22 away from the proximal end forming a central cutout 136 with side wings or side extensions.

Figure 5:
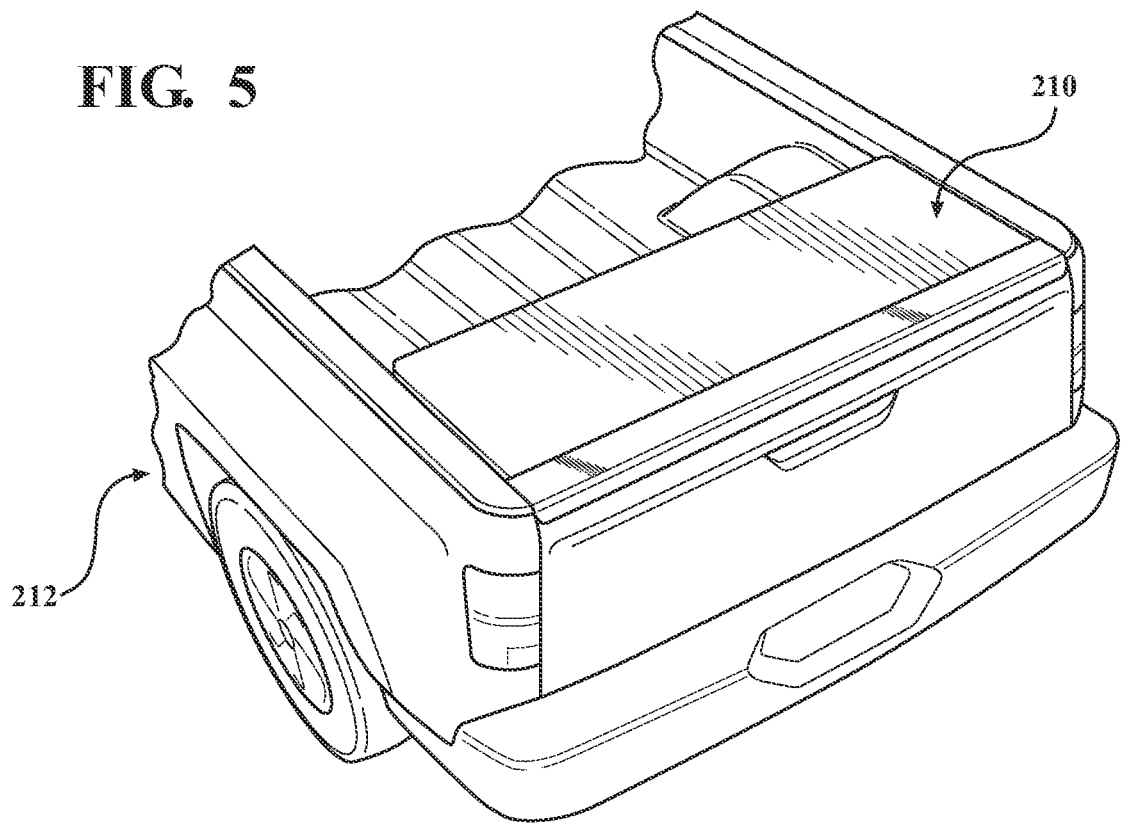
FIG. 5 is a perspective view of the vehicle tailgate assembly incorporated with an active bed cover assembly shown in a deployed position, in accordance with yet another embodiment of the present invention.
Figure 6:
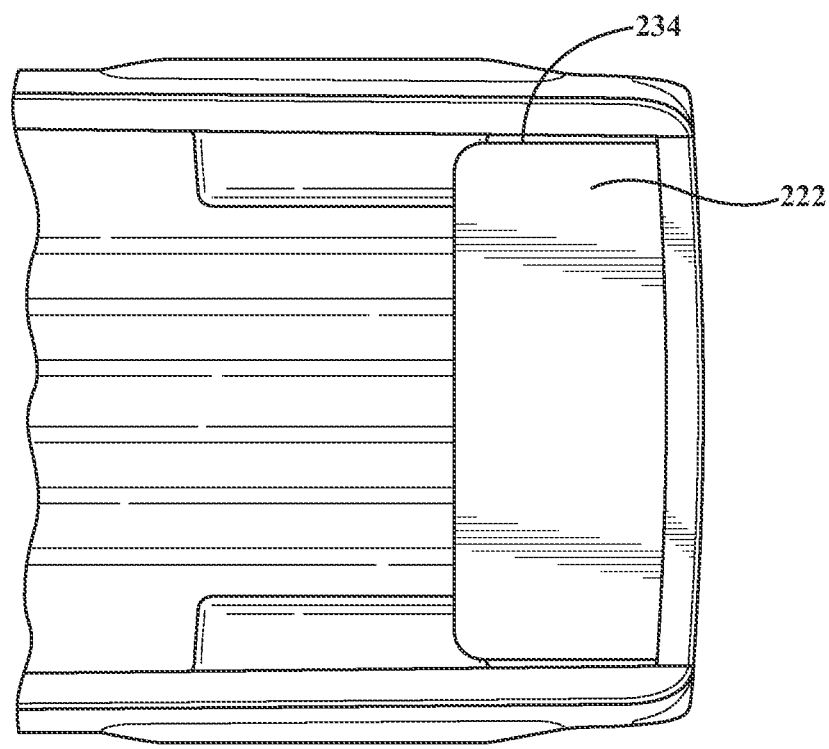
FIG. 6 is a top plan view of the vehicle tailgate assembly incorporated with the active bed cover assembly of FIG. 5 in the deployed position.

Referring to FIGS. 5-6 generally, in accordance with another embodiment of the present invention, an active bed cover assembly generally shown at 210 for a vehicle 212 is identical to the first embodiment except that the deployable panel 222 as a different profile in that the sides are straight and the distal end of the panel 222 extends substantially from one side wall 16 to the other 18.

The deployable panel 22, 122, 222 is made of a composite plastic in these particular embodiments. However, depending on the particular application, it is also within the scope of the invention to manufacture the deployable panel 22, 122, 222 of different materials such as steel or aluminum, painted carbon fiber, extruded rubber, or other suitable impact resistant material to withstand a predetermined load without departing from the scope of the invention. Additionally, the deployable panel 22, 122, 222 may consist of a single piece, e.g., of molded composite plastic, or multiple pieces assembled together.

Figure 7:
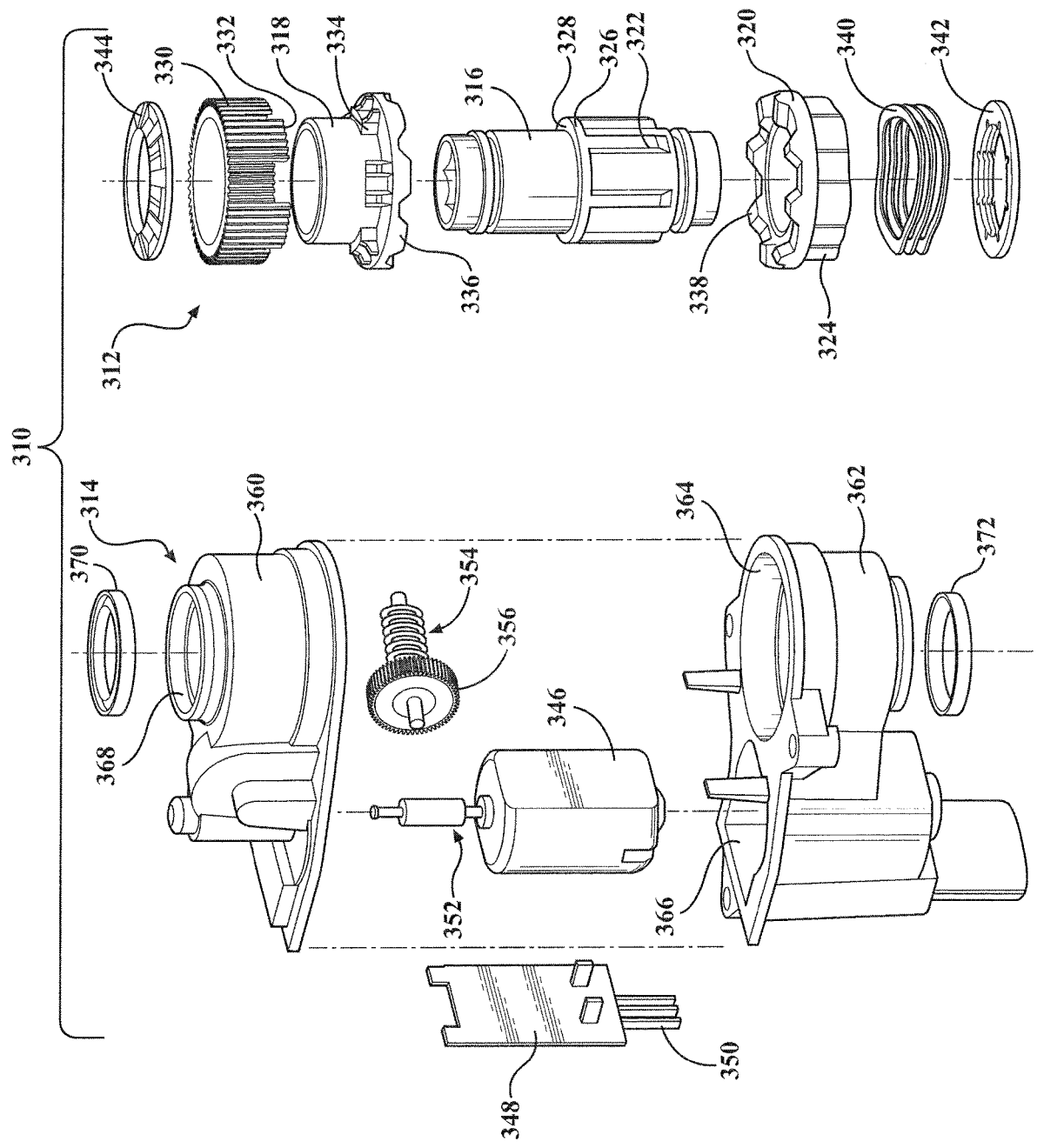
FIG. 7 is an exploded view of an exemplary actuator with internal clutching for deploying/stowing the active bed cover assembly, in accordance with the present invention.
Figure 8:
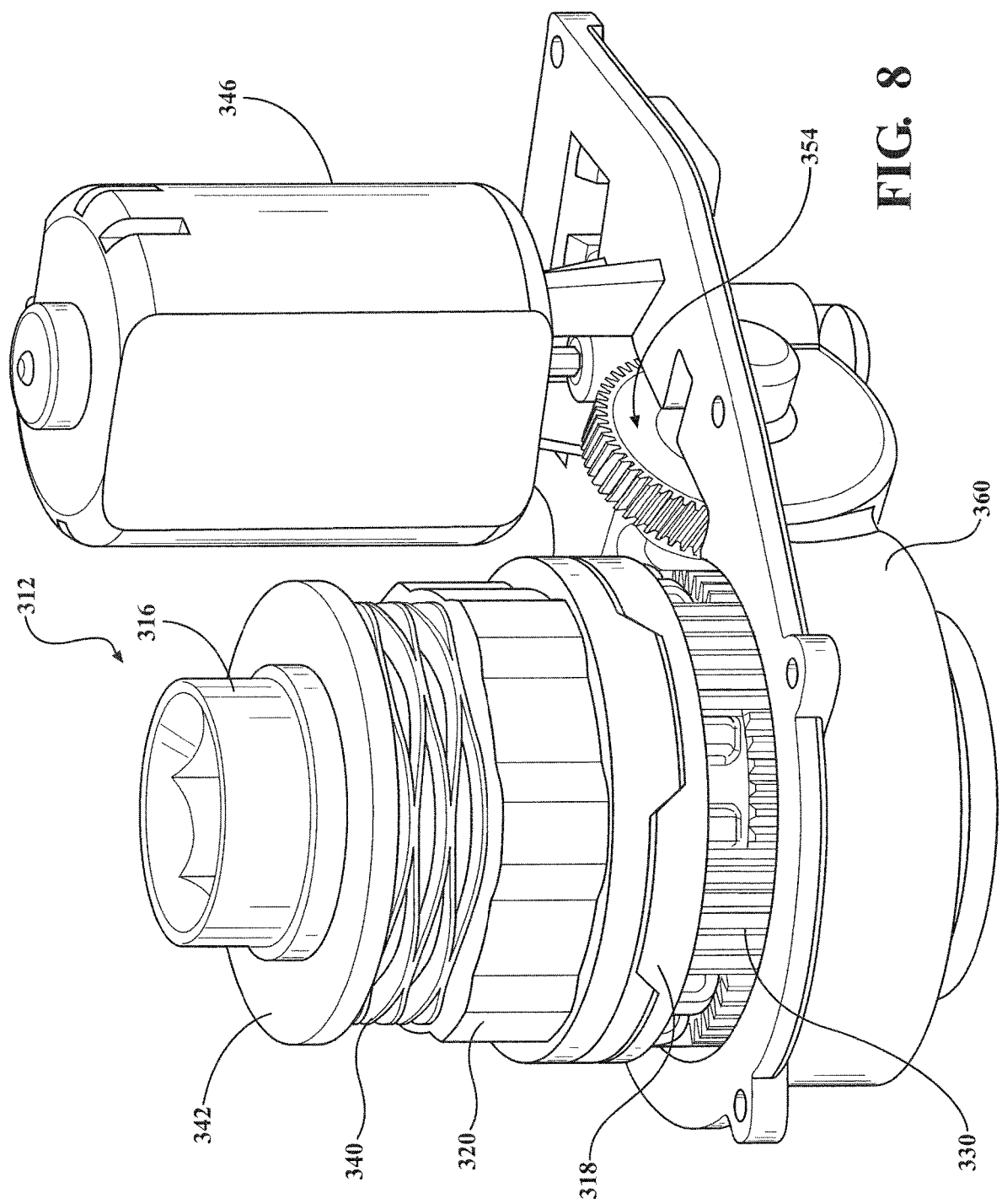
FIG. 8 is a perspective view of the actuator of FIG. 7 without the housing for clarity.

Referring generally to FIGS. 7-8, the actuator 30 used in any embodiment can be declutchable. An exemplary actuator assembly with internal clutching is shown generally at 310, comprising a clutch system, generally shown at 312, as will be explained in further detail below. Generally, there is provided a sealed actuator with internal clutching assembly in accordance with the present invention which provides desirable higher cycle durability and capability combined with a water tight arrangement for use, by way of example, in underbody environments exposed to the elements. The sealed actuator with internal clutching assembly further provides a safety override clutch system which allows the actuator to rotate under predetermined conditions, e.g., predetermined high loads, to help protect a motor and other components of the actuator with internal clutching assembly, as will be explained in greater detail below. When subjected to abnormal loads or a predetermined amount of force or other predetermined conditions, the actuator with internal clutching assembly will move features out of the way to help prevent damage thereto.

Figure 9:
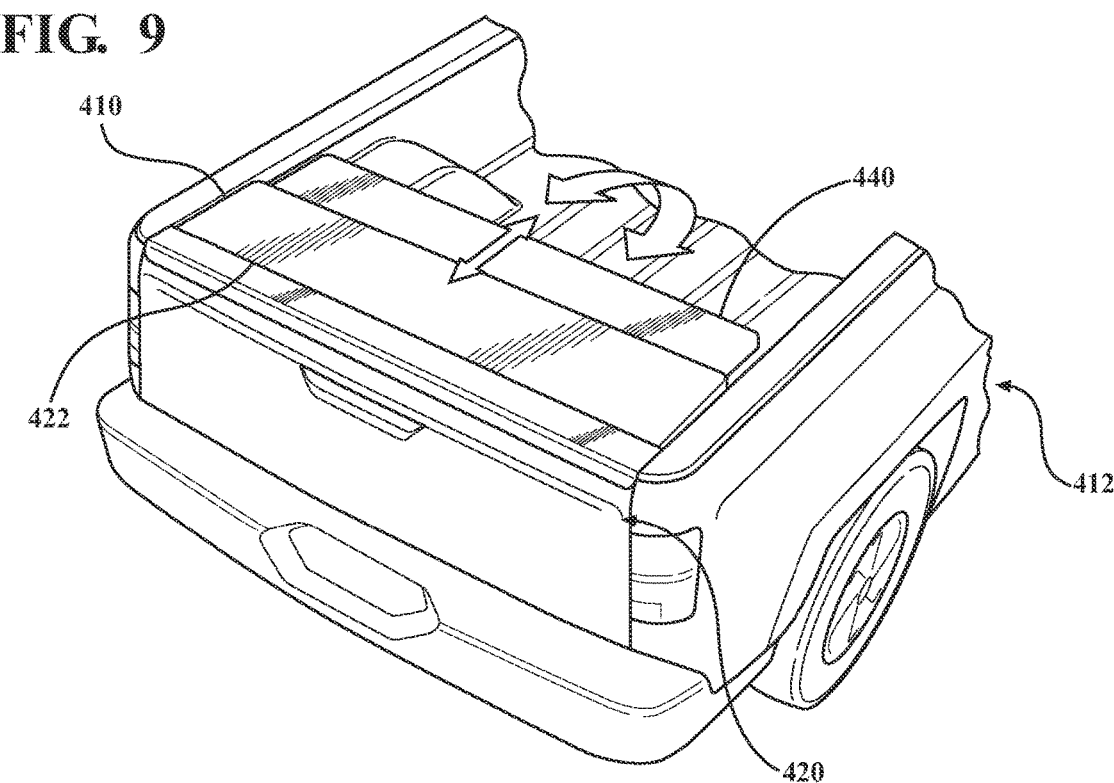
FIG. 9 is a perspective view of a tailgate assembly with an active bed cover assembly including an integrated slide out panel shown in a deployed position, in accordance with a fourth embodiment of the present invention.

Referring to FIG. 9 generally, in accordance with a fourth embodiment of the present invention, an active bed cover assembly generally shown at 410 for a vehicle 412 is identical to the first embodiment except that a slide out panel 440 is slidably connected to the deployable panel 422 to slide in/out. Just as with the first embodiment, the deployable panel 422 is rotated up/down by the at least one actuator between a deployed position and stowed position. However, the slide out panel 440 is slidable received within or under, most preferably within, the deployable panel 422 such that when stowed, the slide out panel 440 is not seen when the deployable panel 422 is stowed flush within the inner panel of the tailgate 420. When the active bed cover assembly 410 is in the extended/up or deployed position, the deployable panel 422 and slide out panel 440 improve airflow. To deploy the assembly the panels 422, 440 are rotated upward as a unit and the slide out panel 440 is then slide outward to the fully extended position by the same or an additional actuator. To stow the assembly, the slide out panel 440 slides into the deployable panel 422 and the panels 422, 440 are rotated downward as a unit into the tailgate depression.

Figure 10A:
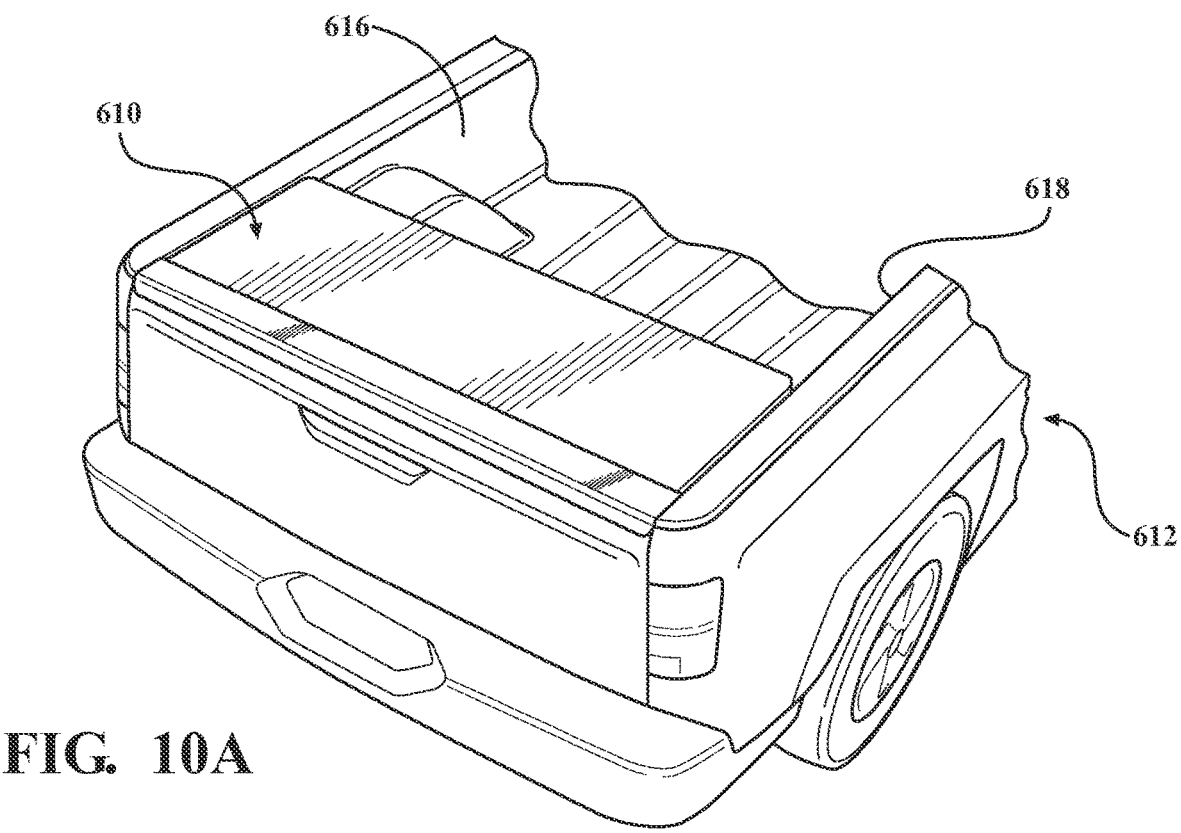
FIG. 10A is a front perspective view of a tailgate assembly with an active bed cover assembly including a rollable panel shown in a deployed position, in accordance with a fifth embodiment of the present invention.
Figure 10B:
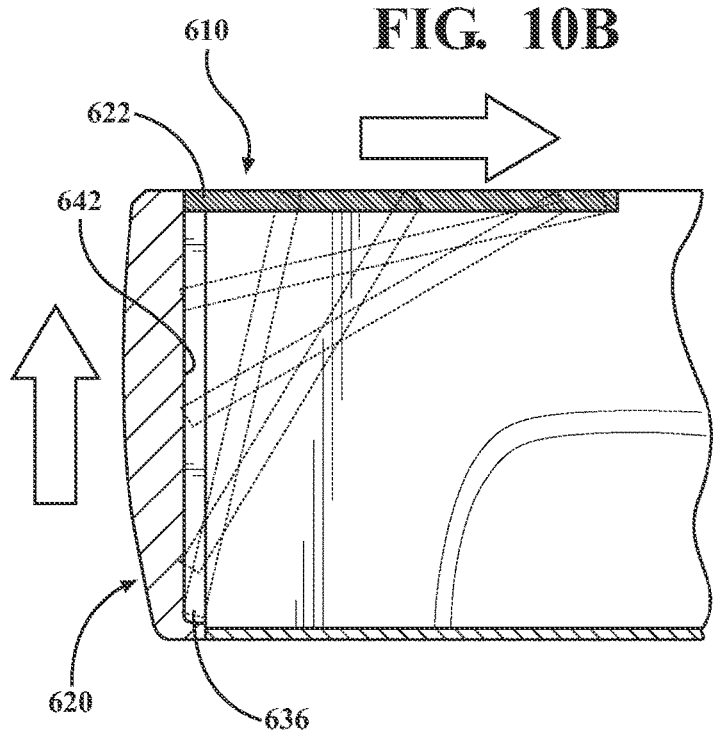
FIG. 10B is a broken-away side view schematic of the assembly of FIG. 10A illustrating stages of deployment of the rollable panel from a stowed position to the deployed position.

Referring to FIGS. 10A-10B generally, in accordance with a fifth embodiment of the present invention, there is provided an active bed cover assembly generally shown at 610 for a vehicle 612 movable between the deployed position (See FIG. 10A) and the stowed position. The deployable panel 622 and a track arrangement 642 embedded in the depression 636 formed in tailgate 620 and toward the upward inner edge of the side walls 616, 618 forms a garage door style panel system. A first set of rollers or the like are connected toward the first end of the panel 622 to follow the track (slide or roll) in an upward/downward direction (FIG. 10B) when the panel is driven by the actuator. A second set of rollers or the like are connected toward the second end of the panel 622 to follow the track (slide or roll) in an outward/inward direction (FIG. 10B) when the panel is driven by the actuator. FIG. 10B illustrates stages of deployment of the rollable panel from a stowed position to the deployed position and back. Typically, the tracks 642 have a 'U' shaped cross-section and are bolted in the base of the 'U' to the tailgate 620 and side walls 616, 618. However, depending on the application tracks 624 are welded, riveted, secured with adhesive and/or epoxy or otherwise connected depending on the application. Optionally, each track includes a first end and a second end with respective stop features in the second end. When the actuator drives the panel 622 to the stowed position the panel 622 is embedded within the depression 636 of the tailgate such that the panel 622 is flush with the tailgate.

Figure 11:
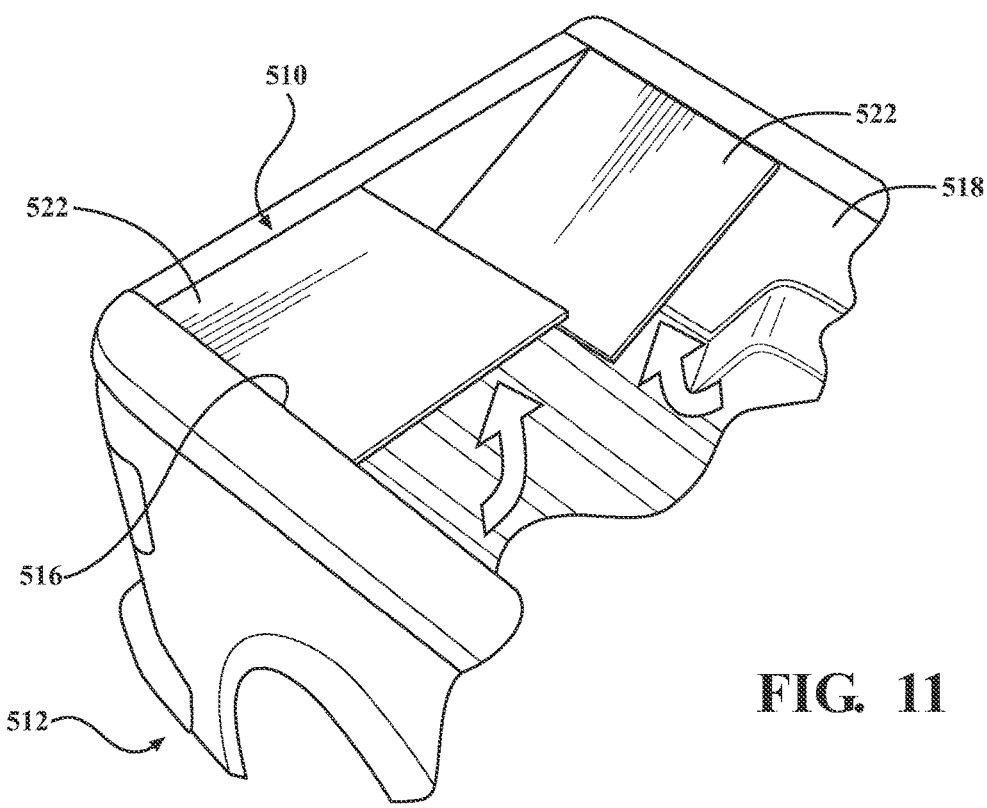
FIG. 11 is a perspective view of a vehicle with an active bed cover assembly including integrated side flip out panels shown in a partially deployed position, in accordance with a sixth embodiment of the present invention.

Referring to FIG. 11 generally, in accordance with a sixth embodiment of the present invention, there is provided an active bed cover assembly generally shown at 510 for a vehicle 512. At least two panels 522 are pivotally connected to the upward inner edge of the side walls 516, 518. Each panel 522 has at least one hinge, the same or different than the first embodiment, to connect the panels to the side walls 516, 518. The panels 522 rotate independently upward to a deployed position, using the same or different actuator and drive shaft as the first embodiment. Depending on the application the panels 522 deploy simultaneously. The actuators rotate each panel 522 down to the stowed position into the bed liner of the cargo bed (against the side walls 516, 518).

Figure 12B:
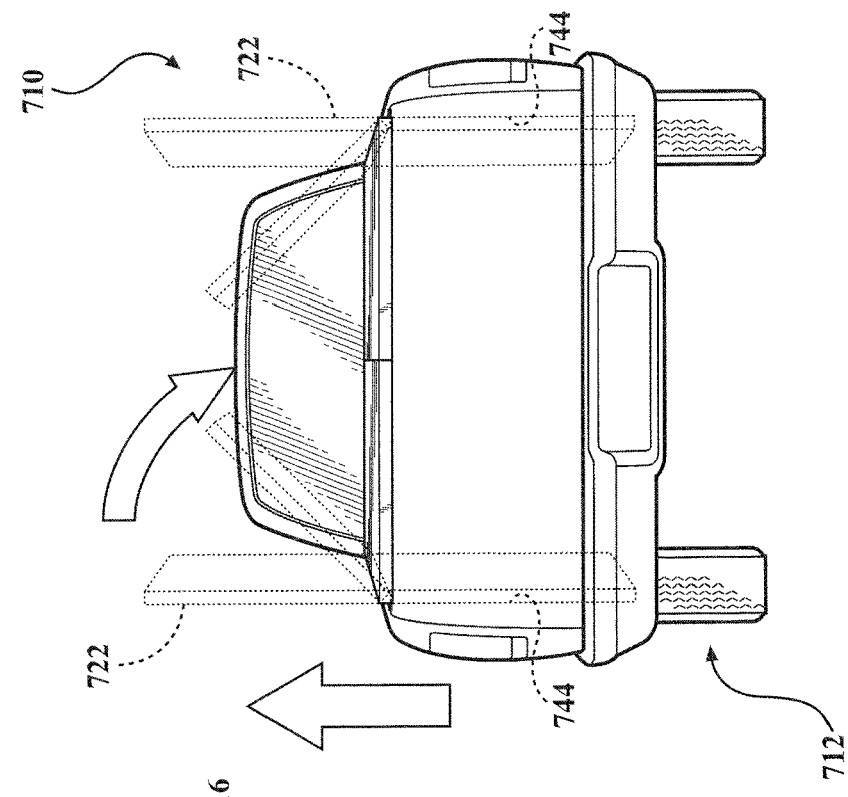
FIG. 12B is a rear elevation schematic of the assembly of FIG. 12A illustrating stages of deployment of the side flip out panels from a stowed position to the deployed position.
Figure 12A:
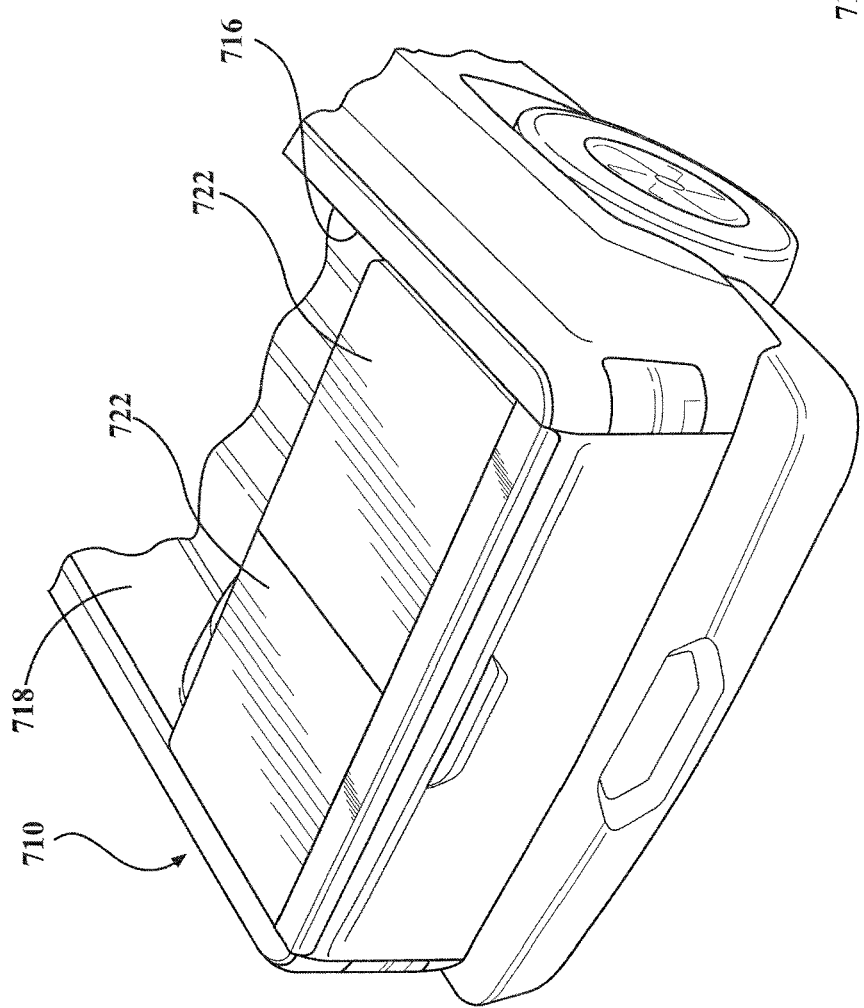
FIG. 12A is a perspective view of a vehicle with an active bed cover assembly including integrated side flip out panels shown in a deployed position, in accordance with a seventh embodiment of the present invention.

Referring to FIGS. 12A-12B generally, in accordance with a seventh embodiment of the present invention, there is provided an active bed cover assembly generally shown at 710 for a vehicle 712. At least two panels 722 form integrated flip out panels, each slidably disposed within a respective cavity 744 of the cargo bed 714. Each panel 722 is also pivotally connected toward the upward inner edge of a respective side wall 716, 718. Each panel 722 has at least one hinge, the same or different than the first embodiment, to connect the panels to the side walls 716, 718. At least one actuator drives the panels 722 upward to clear the cavity 744 and then rotates each panel 722 independently down to a deployed position (FIG. 12A), using the same or different actuator and drive shaft as the first embodiment. Depending on the application the panels 722 deploy simultaneously. The panels 722 in the deployed position form a single horizontal panel over the cargo bed to improve aerodynamics. The actuators rotate each panel 722 up and then slide the panels 722 into each cavity 744 to the stowed position. Each cavity 722 is formed in the respective side of the bed liner of the cargo bed, and, alternatively, in the space between the bed liner and vehicle 712 outer side panel.

Optionally, the cavity 744 can include a mechanism, e.g., including ball bearings, tracks, or other mechanism, used to move the panel 722 about the ball bearings when the assembly 710 is being changed from the stowed position to a partially deployed position or vice versa. When the panel 722 is in the partially deployed position, the panel 722 slides along the surface of the cavity 744 so that the top of the panel 722 is at a greater height than the top of the side walls 716, 718 before rotating downward to the fully deployed position horizontal to the cargo bed floor.

Referring to FIGS. 13A-13D generally, in accordance with an eighth embodiment of the present invention, there is provided an active bed cover assembly generally shown at 810 for a vehicle 812. At least two panels form an integrated folding panel indicated generally at 822 comprised of a first panel 848 connected to a second panel 850 by at least one joint 852. Each panel has a first end and a second end. The proximal end 854 of the first panel 848 is pivotally connected to the tailgate 820 toward the top of a depression 836 formed in the tailgate. Preferably, the sides of the first end 854 are adapted to form the pivotable connection. The second end of the first panel 848 is pivotally connected to the first end of the second panel 850 at joint 852. Generally, the second end 856 of the second panel 850 is free floating. Typically, the second end 856 of the second panel 850 is slidably connected to the side walls 816, 816 of the cargo bed. Preferably, the sides of the second end 856 are adapted to slide or roll within tracks formed in or connected to the side walls 816, 818. At least one actuator drives the integrated folding panel 822 to the deployed position (FIGS. 13A, 13D), using the same or different actuator and drive shaft as the first embodiment. When the actuator drives the integrated folding panel 822 to the stowed position (FIG. 13B), the panels 848, 850 fold downward upon one another and are embedded within the depression 836 of the tailgate such that the second panel 850 is flush with the tailgate. The assembly 810 could be jointed or hinged in the opposite direction without departing from the scope of the invention.

Referring to FIGS. 14A-14D generally, in accordance with a ninth embodiment of the present invention, there is provided an active bed cover assembly generally shown at 910 for a vehicle 912. A plurality of panels form an integrated stacking panel indicated generally at 922. At least three panels are shown, including a first panel 948 pivotally connected to the tailgate, a second panel 950 operably slidably connected to the first panel 948, and a third panel 958 which is operably slidably connected to the second panel 950. When in the stowed position (FIG. 14B) the integrated stacking panel 922 are folded or stacked up to one another and are embedded within the depression 936 of the tailgate such that the third panel 958 is flush with the tailgate.

Figure 14B:
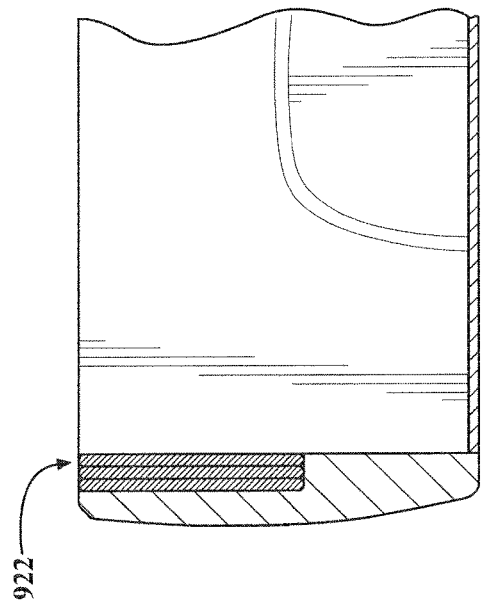
FIG. 14B is a broken-away side view of the cover assembly of FIG. 14A illustrating the folding panel in a stowed position.
Figure 14D:
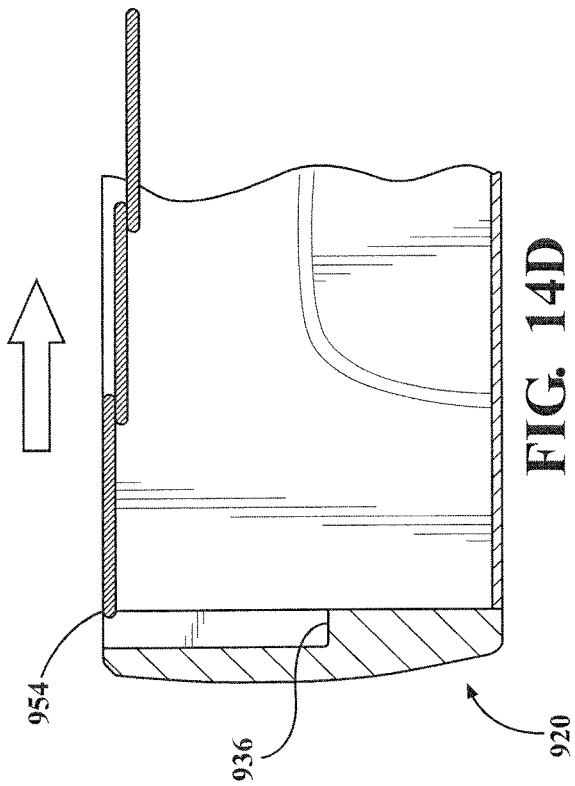
FIG. 14D is a broken-away side view of the assembly of FIG. 14C illustrating the stacking panel slidably extended to the deployed position.
Figure 14A:
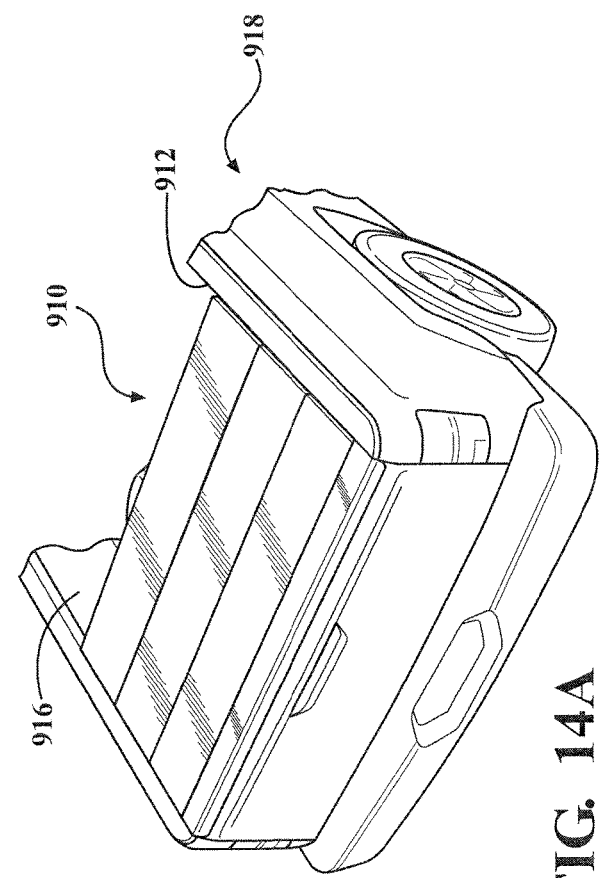
FIG. 14A is a perspective view of a tailgate assembly with an active bed cover assembly including an integrated stacking panel shown in a deployed position, in accordance with a ninth embodiment of the present invention.
Figure 14C:
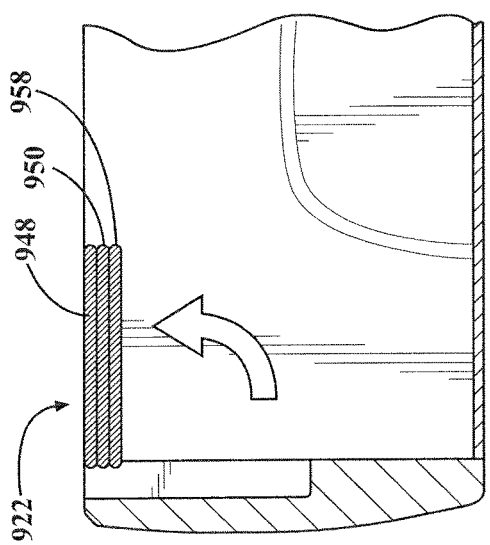
FIG. 14C is a broken-away side view of the assembly of FIG. 14A illustrating rotational movement of the stacking panel from a stowed position toward the deployed position.

Each panel 948, 950, 958 has a first end and a second end. The proximal end 954 of the first panel 948 is pivotally connected to the tailgate 920 toward the upper outer edge of a depression 936 formed in the tailgate. Preferably, the sides of the first end 954 are adapted to form the pivotable connection. When the actuator drives the integrated stacking panel 922 to the deployed position (FIGS. 14A, 14D), the panel 922 is first rotated upward to a partially deployed position (FIG. 14C). Typically, the actuator drives rotation of the first panel 948 and all three panels move upward as a unit. The actuator then drives the second and third panels 948, 958, either consecutively or simultaneously, to extend, e.g., slidably extend, outward to the deployed position (FIG. 14D). Thus, adjacent panels track with one another such that as one is driven outward the other is pushed or pulled outward, and as one is driven in the other direction the other is pushed or pulled toward the same direction. Typically, at least one of the panels 848, 950, 958 is adapted to track in a respective track connected to or formed in the side walls 916, 918 of the cargo liner. Optionally, stops are incorporated with the second end of both the first and second panel 948, 950 to stop panels from extending further than desired. The panels could be stacked in the opposite orientation such that the first panel 948 is below the second panel 950 which is below the third panel 958 without departing from the scope of the invention.

Figure 15A:
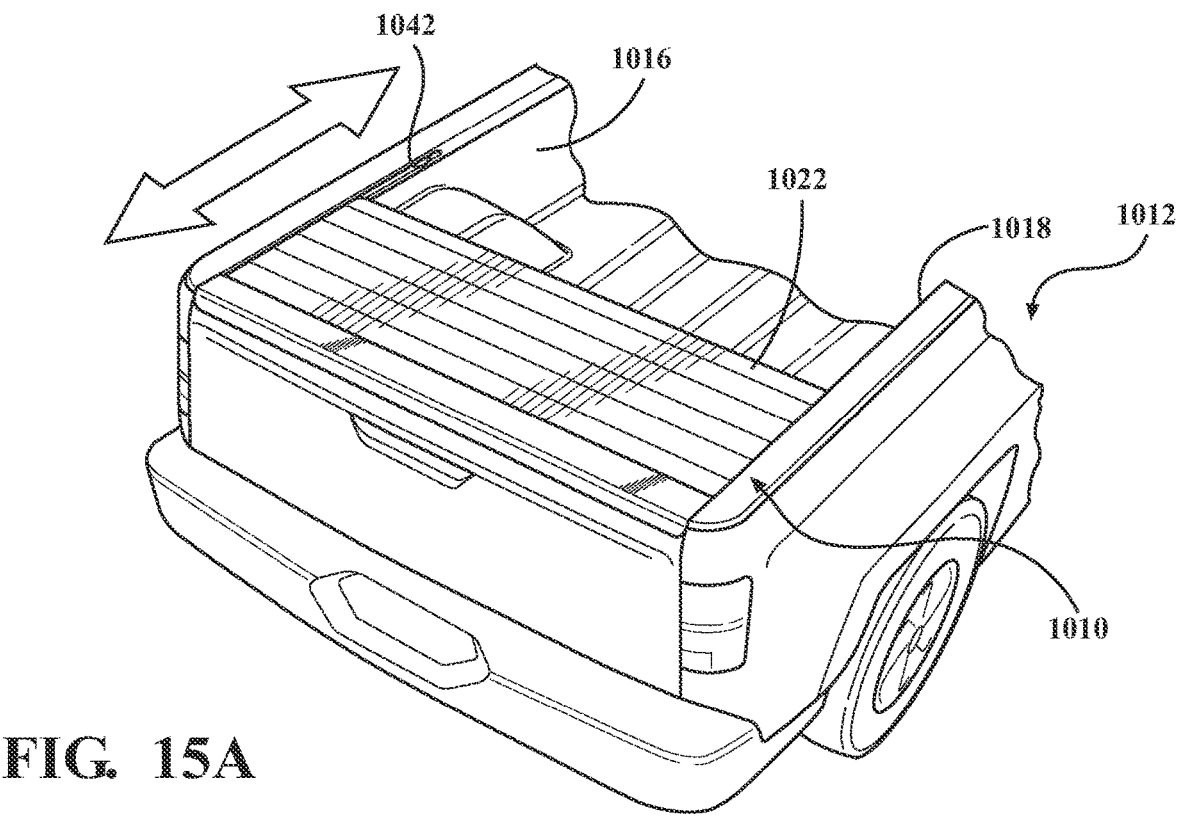
FIG. 15A is a perspective view of a tailgate assembly with an active bed cover assembly including a tambour door panel shown in a partially deployed position, in accordance with a tenth embodiment of the present invention.
Figure 15B:
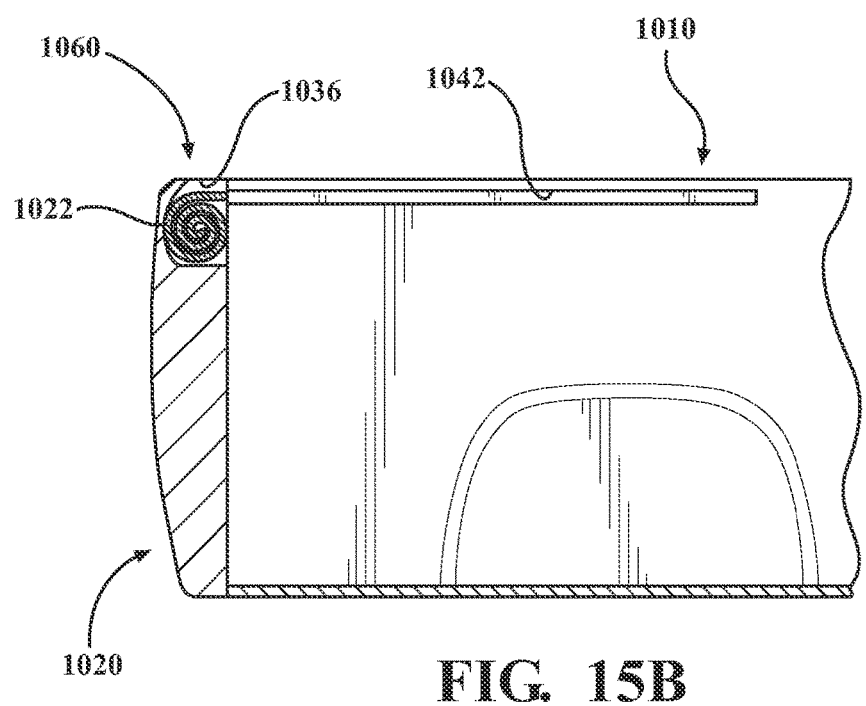
FIG. 15B is a broken-away side view of the assembly of FIG. 15A illustrating the tambour door panel uncoiling and slidably extending toward the deployed position.

Referring to FIGS. 15A-15B generally, in accordance with a tenth embodiment of the present invention, there is provided an active bed cover assembly generally shown at 1010 for a vehicle 1012 movable between a stowed position and a deployed position (partially deployed depicted in FIG. 15A). A deployable panel 1022 forms a tambour door-type panel slidably connected to tracks 1042 formed in or connected to the side walls 1016 and 1018 of the vehicle. When driven to the stowed position (FIG. 15B) the panel 1022 is rolled 1060 such that the rolled up panel 1022 becomes embedded within a depression 1036 formed in the tailgate 1020 so that the roll 1060 is flush with the tailgate. As the actuator drives the panel to the deployed position the panel 1022 unrolls and the leading side edges translate along the tracks 1042 to the deployed position. Typically, the tracks 1042 have a 'U' shaped cross-section and are bolted in the base of the 'U' to the upper side walls 1016, 1018. However, depending on the application tracks 1042 are welded, riveted, secured with adhesive and/or epoxy or otherwise connected depending on the application. Optionally, each track includes a second end with respective stop features.

Figure 16:
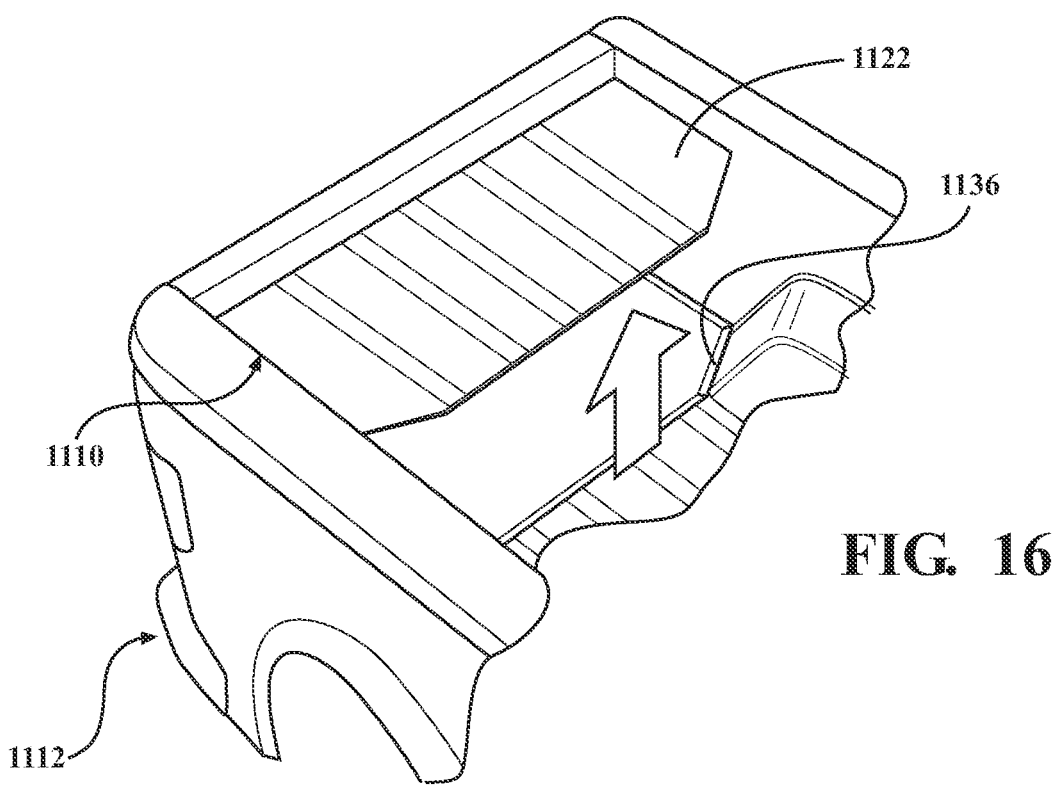
FIG. 16 is a perspective view of a vehicle with an active bed cover assembly including an integrated floor panel shown in a deployed position, in accordance with an eleventh embodiment of the present invention.

Referring to FIG. 16 generally, in accordance with an eleventh embodiment of the present invention, there is provided an active bed cover assembly generally shown at 1110 for a vehicle 1112 movable between a stowed position and a deployed position (FIG. 16). A deployable panel 1122 forms an integrated floor panel that rests horizontally on the floor of the cargo bed, e.g., within a depression 1136 such that the panel 1122 is flush with the floor. At least one actuator drives the entire horizontal panel 1122 to lift upward, e.g., floor elevator lift-type system incorporating a track conveyor and/or track mechanism, to the deployed position and down to the stowed position.

Figure 17:
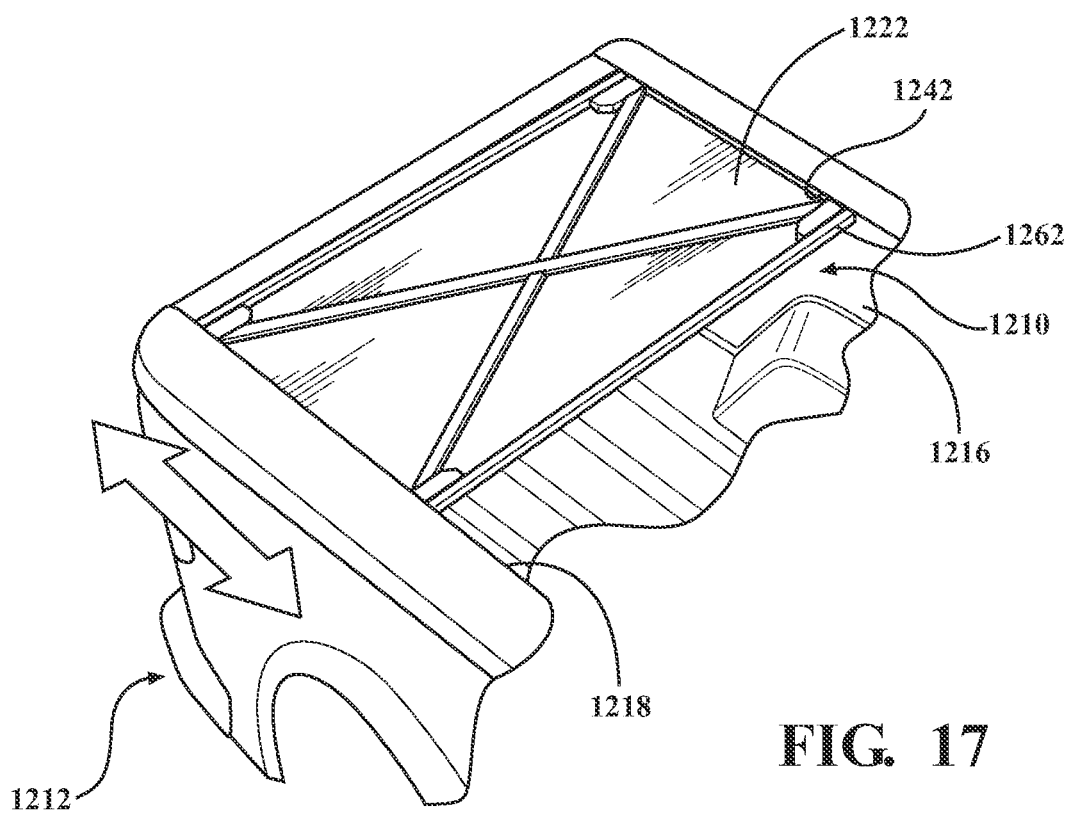
FIG. 17 is a perspective view of a vehicle with an active bed cover assembly including a scissor hinge panel shown in a deployed position, in accordance with a twelfth embodiment of the present invention.

Referring to FIG. 17 generally, in accordance with an twelfth embodiment of the present invention, there is provided an active bed cover assembly generally shown at 1210 for a vehicle 1212 movable between a stowed position and a deployed position (FIG. 17). A deployable panel 1222 forms a scissor hinge panel. The panel is formed of a flexible and/or soft material, e.g., fabric, vinyl or other material, and is framed in semi-rigid or rigid material along at least the front edge, rear edge and diagonally. Typically, a screw drive and higher speed actuator is employed. The ends of the front frame bar 1262 can be adapted such that when driven to the stowed position the bar 1262 slides rearward within tracks 1242 formed in or connected to the side walls 1216, 1218 of the cargo bed.

Figure 18:
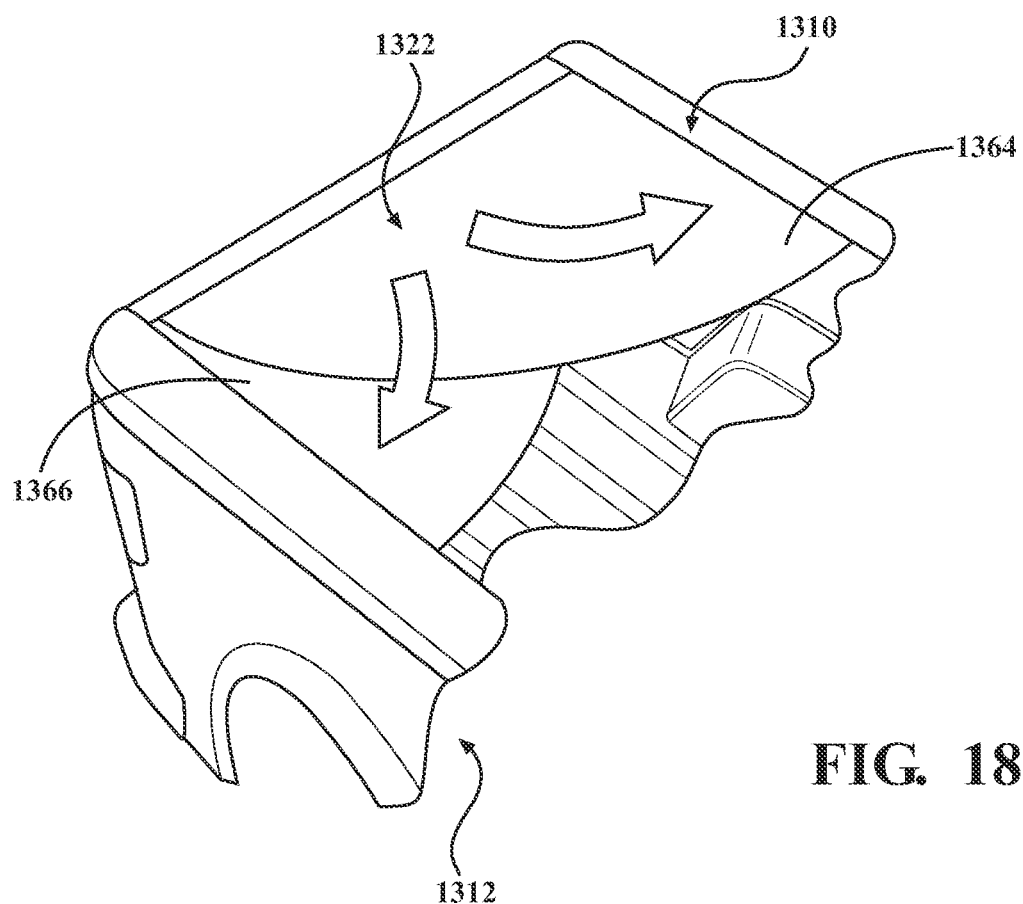
FIG. 18 is a perspective view of a vehicle with an active bed cover assembly including a hinged sail panel shown in a deployed position, in accordance with a thirteenth embodiment of the present invention.

Referring to FIG. 18 generally, in accordance with a thirteenth embodiment of the present invention, there is provided an active bed cover assembly generally shown at 1310 for a vehicle 1312 movable between a stowed position and a deployed position (FIG. 18). A deployable panel 1322 forms hinged sail panel comprising a first panel 1364 over a second panel 1366. The panel 1322 is formed of a flexible material, e.g., fabric, vinyl or other material, and is driven outward to the extended deployed position and inward toward the tailgate to the stowed position.

Figure 19:
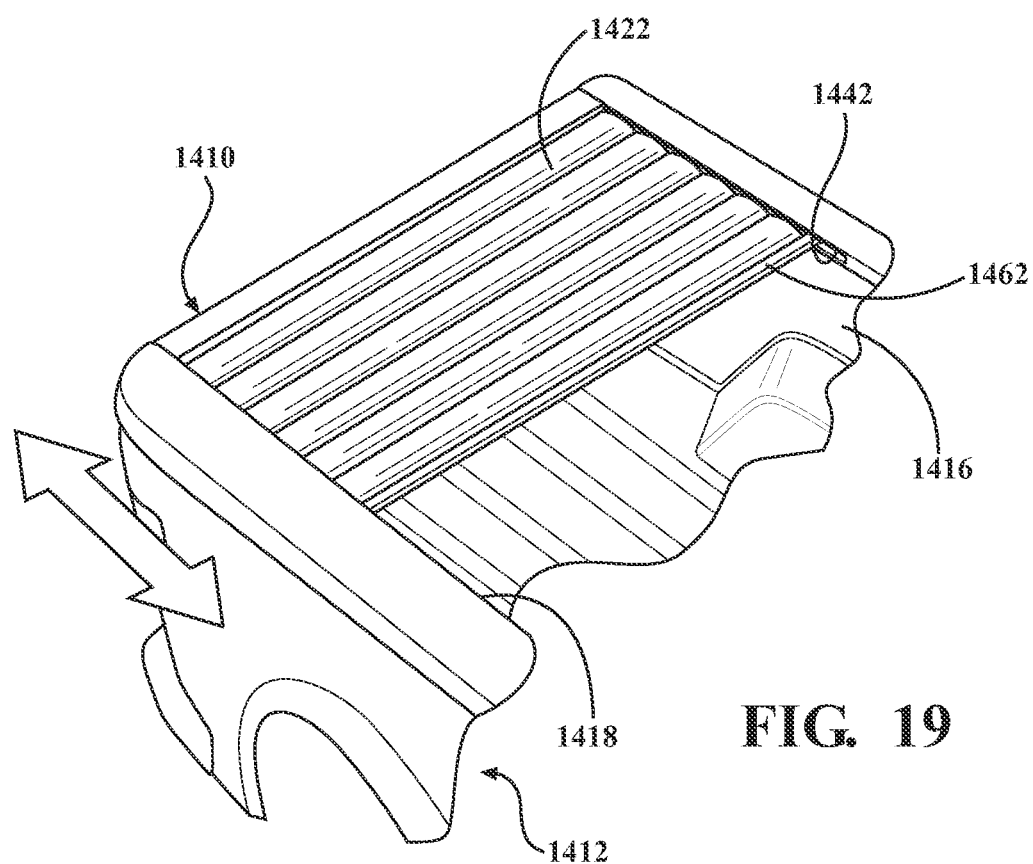
FIG. 19 is a perspective view of a vehicle with an active bed cover assembly including an inflatable bladder panel shown in a deployed position, in accordance with a fourteenth embodiment of the present invention.

Referring to FIG. 19 generally, in accordance with an fourteenth embodiment of the present invention, there is provided an active bed cover assembly generally shown at 1410 for a vehicle 1412 movable between a stowed position and a deployed position (FIG. 19). A deployable panel 1422 forms an inflatable bladder panel. The panel is formed of a material suitable for inflating. At least the front of the panel 1422 is connected to a semi-rigid or rigid bar 1462. The ends of the front frame bar 1462 are adapted such that as the panel 1422 is inflated either the panel moves the bar 1462 along tracks 1442 or the bar 1462 is driven outward toward the deployed position pulling the panel 1422 with it. For stowing, the bar 1462 is driven to slide rearward within the tracks 1442 formed in or connected to the side walls 1416, 1418 of the cargo bed to the stowed position against the tailgate.

Figure 20:
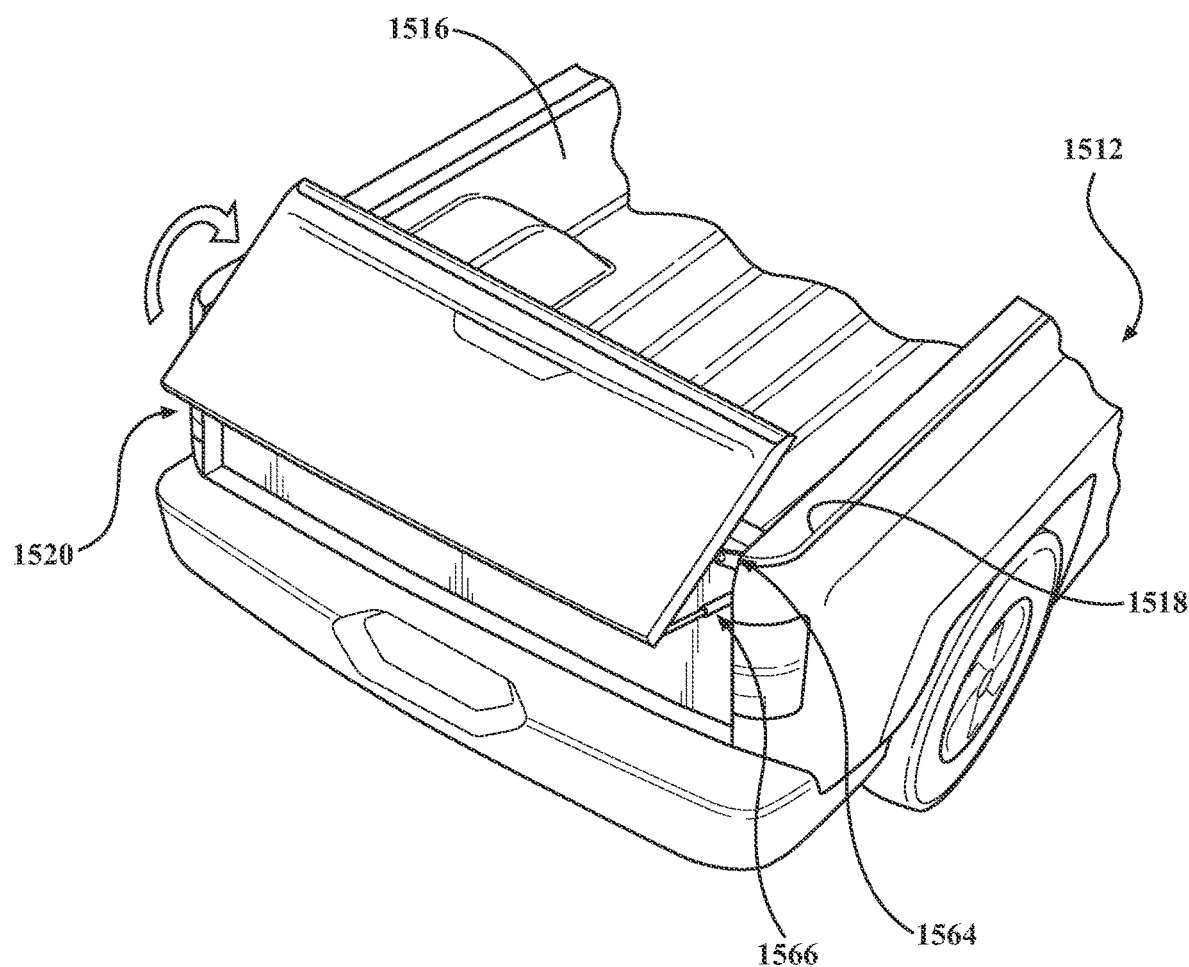
FIG. 20 is a perspective view of a vehicle with an integrated active bed cover assembly, in accordance with a fifteenth embodiment of the present invention.

Referring to FIG. 20 generally, in accordance with a fifteenth embodiment of the present invention, there is provided an active bed cover assembly integrated with the back panel of the tailgate assembly 1520 for a vehicle 1512 movable between a stowed position and a deployed position. A linkage assembly indicated generally at 1564 connects the back panel 1520 toward the top inner edge of the cargo bed side walls 1516, 1518 of the vehicle. A lift assist mechanism, e.g., gas struts, generally indicated at 1566 is provided on both sides of the panel 1522. Lift assist mechanism 1566 includes a gas cylinder and actuation shafts received in compressed air assist type pneumatic cylinder bodies. When the tailgate/panel 1522 is driven to the deployed position, the cylinder applies force to the linkage 1564 assisting the tailgate/panel in a deployed direction until the tailgate/panel 1522 is horizontal. When the tailgate/panel 1522 is driven to the stowed position, the cylinder provides force assistance in a stowed direction until the tailgate/panel 1522 is vertical. Thus, the entire tailgate 1520 rotates up and down and improves aerodynamics when in the up/horizontal position.

Referring generally to FIGS. 7-8, an exemplary actuator assembly with internal clutching is shown generally at 310, provided with a clutch system shown generally at 312, where the actuator 310 is employable with any embodiment described herein. At least one actuator 310 with internal clutching is used or other actuator and/or in combination with any additional actuator(s) is/are used in the system.

The clutch system 312 comprises a housing portion indicated generally at 312, an output shaft 316 which is received within and holds an output detent ring 318 and a moving detent ring 320.

During normal operation of the active bed cover assembly 10, etc, the actuator assembly 310 provides power to drive and move the at least one panel 22, etc between at least the stowed position and deployed position. Also connected to the actuator assembly 310 is a rotatable drive shaft, e.g., drive shaft 32, that is operably connected to the at least one panel 22, etc and the output shaft 316 of the actuator assembly 310. The drive shaft 32 functions to deploy the at least one panel 22, etc in the event of predetermined conditions sensed by the actuator assembly 310 in order to move the at least one panel 22, etc to a fully extended deployed position for improved aerodynamics.

The output detent ring 318 is free to rotate on the output shaft 316 about a portion of the output shaft 316 that is not splined. The moving detent ring 320 is able to move axially to the output shaft 316 but is locked radially by a plurality of interlocking splines 322, 324 on both components. The output shaft 316 has interlocking splines 322 that are arranged parallel to the longitudinal axis and operably spaced about an outer surface located on a lower half of the output shaft 316. The moving detent ring 320 has outer interlocking splines 324 forming complementary channels to slidably interlock with the interlocking splines 322 for controlled axial movement of the moving detent ring 320. The interlocking splines 322 of the output shaft 316 terminate at an integrally formed projecting ring 326 having an abutting surface 328, lying transverse to the axis, against which the output detent ring 318 engages. The output detent ring 318 abuts against this surface 328 on the output shaft 316 and does not move axially.

An output gear 330 is in mesh with the output detent ring 318 for transmitting torque. The output gear 330 has spaced circumferential segments 332 that are generally square teeth like shaped held in place within opposing recesses 334 of the output detent ring 318 for transmitting the torque.

The output and moving detent rings 318, 320 have first and second intermeshing ramped teeth, generally shown at 336, 338, respectively, that are held together in mesh by the biasing force of a wave spring 340. The wave spring 340 is received on the outer output shaft 316 and provides a biasing force against the moving detent ring 320 in the direction of the output detent ring 318.

The components of the clutch system 310 (e.g., output shaft 316, output gear 330, output detent ring 318, moving detent ring 320, and wave spring 340) are held together by first and second locking rings 342, 344 located toward respective ends the output shaft 316 of the clutch assembly 312.

A motor 346 selectively provides torque suitable for particular applications. Suitable electronics 348, most preferably, a shut off printed circuit board (PCB) with connector contacts 350 correlate with vehicle communication networks for commanding the motor 46 based upon predetermined conditions, e.g., commanding energizing of the motor correlating with predetermined vehicle speed ranges. The PCB electronics senses current spike for override, which allows the clutch to disengage the drive system allowing it to rotate freely.

The motor 346 has a worm gear, shown generally at 352, which causes a main gear, shown generally at 354, to rotate. The main gear 354 has a gear and a helix angle portion 358. The worm gear 352 has a shaft, e.g., a threaded shaft, which engages the teeth of the gear 356, which causes the gear 356 of the main gear 354 to rotate as the worm gear 352 rotates. Rotation of the gear 356 causes the helix angle portion 358 of the main gear 354 to also rotate. The helix angle portion 358 rotatably engages the output gear 330. The gear ratio range of the gear 356 to helix angle portion 358 is operably suitable for transmitting torque from the motor/worm gear 346/352 to the output gear 330. The first and second intermeshing ramped teeth 336, 338 of the output and moving detent rings 318, 320 when held together by the biasing force of the wave spring 340 lock and allow the output shaft 316 to rotate and transmit the torque of the motor 346 through the main gear 354 and output gear 330 to the outside of the housing portion 314. The output shaft 330 is operably coupled to the drive shaft 32 for selectively rotating, folding or otherwise moving at least one panel 22 etc between at least the stowed position and the deployed position. The wave spring 340 allows for a more compact structure while meeting biasing and predetermined load requirements.

The housing portion 314 comprises a first half 360 and a second half 362. The first half 60 has a first clutch assembly cavity 364 and a first motor cavity 366. The second half 362 has a second clutch assembly cavity 368, a main gear cavity 370, and a second motor cavity. The clutch system 312 fits fully inside the first and second halves 360, 362 of the housing (within the first and second clutch assembly cavities 364, 368), as well as the motor 346 and electronics 348/350 (within the first motor cavity 366 and second motor cavity), and main gear 354 (within the main gear cavity 370). The first and second halves 360, 362 of the housing portion 314 are joined together, and connected with fasteners, and first and second seals added 372, 374 onto the output shaft 316 to form a weathertight housing. The housing 314 may be formed in the tailgate module 20, etc. without departing from the scope of the invention.

In operation, the first and second intermeshing ramped teeth 336, 338 of the output and moving detent rings 318, 320, that when held together by the biasing force of the wave spring 340, lock together and allow the output shaft 316 to rotate. This allows torque transmission from the motor 346/worm gear 352 through the main gear 354 and output gear 330 to the outside of the housing portion 314 via the output shaft 316 to the drive shaft 32. During a predetermined level of high load, the first and second intermeshing ramped teeth 336, 338 create an axile force that overcomes the load from the wave spring 340. This allows the moving detent ring 320 to disengage and allow the output shaft 316 to rotate freely, thereby preventing damage to the sealed actuator internal clutching assembly 310.

Thus, there is provided a sealed actuator with internal clutching assembly 310 which can drive in both directions, but when stopped will hold its position without back driving when subjected to a predetermined load, e.g., a load many times greater than its dynamic range. The actuator 310 also protects itself from damage from predetermined loads, e.g., very high loads, by means of the clutch that will disengage the drive system allowing it to rotate (e.g., allowing the output shaft 316 to rotate freely). The sealed actuator with internal clutching assembly 310 is in a waterproof housing and can rotate in both directions for as many revolutions as needed. The clutch is fully self contained in the housing. The actuator has an output passthrough drive structure, e.g., output shaft 316 arrangement, allowing it to drive a shaft, e.g., drive shaft 32, or part from either side or both sides. The actuator 310 can be mounted to a fixed part with the only external moving part is the drive shaft 32. The clutch system 312 of the sealed actuator with internal clutching assembly 310 also does not change shape or height when it clutches, which is yet another significant advantage.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A deployable bed cover assembly for a vehicle, comprising
    at least one deployable panel having a predetermined profile, where said deployable panel selectively extends and retracts between a stowed position and a deployed position, where the deployment of the deployable panel improves aerodynamics;
    at least one actuator, where the actuator is in communication with the vehicle and automatically deploys the deployable panel under predetermined conditions; and
    a slide out panel slidably connected to the at least one deployable panel to slide inward and outward between a stowed position relative to the at least one deployable panel and a deployed position extended from the at least one deployable panel to improve aerodynamics.

2. The deployable bed cover assembly of claim 1, wherein the predetermined conditions are selected from vehicle speed, wind direction, yaw, and combinations thereof.

3. The deployable bed cover assembly of claim 2, wherein the predetermined condition is at least vehicle speed in the range of at least 30 miles per hour.

4. The deployable bed cover assembly of claim 1, wherein the actuator communicates with the vehicle to determine proper deployment and function.

5. The deployable bed cover assembly of claim 1, wherein the actuator automatically retracts the deployable panel under predetermined conditions selected from vehicle speed, wind direction, yaw, higher predetermined loads, and combinations thereof.

6. The deployable bed cover assembly of claim 5, wherein the predetermined conditions are at least vehicle speed in the range of less than 30 miles per hour and/or when the actuator senses higher predetermined loads.

7. The deployable bed cover assembly of claim 6, wherein the actuator further provides object detection comprising electronics that sense current spike and provides circuit override.

8. The deployable bed cover assembly of claim 7, wherein the actuator has declutching of gearing so that the deployable panel can move freely out of the way to prevent damage.

9. The deployable bed cover assembly of claim 1, wherein the deployable panel is embedded within a tailgate and/or cargo bed lining when in the stowed position.

10. The deployable bed cover assembly of claim 1, wherein the deployable panel is part of a tailgate module and lies flush when in the stowed position, allowing for a smooth functional surface when the tailgate is down and not limiting access to the cargo bed of the vehicle.

11. The deployable bed cover assembly of claim 10, wherein the deployable panel is operably hinged to the tailgate for flipping up/down between the stowed and deployed positions and is operably coupled to a drive shaft of the actuator both located within the tailgate.

12. The deployable bed cover assembly of claim 1, further comprising a tailgate assembly with a depression formed in an inner panel for receiving the deployable panel such that the deployable panel lies flush with the inner panel of the tailgate assembly when in the stowed position.

13. The deployable bed cover assembly of claim 1, wherein the predetermined profile of the deployable panel is either angled, straight, cutout with side extensions, or combinations thereof.

14. A deployable bed cover assembly for a vehicle, comprising
at least one deployable panel, where said deployable panel selectively extends and retracts between a stowed position and a deployed position, where the deployment of the deployable panel improves aerodynamics;
a slide out panel slidably connected to the at least one deployable panel to slide inward/outward with respect to the at least one deployable panel between a stowed position and an extended deployed position to improve aerodynamics;
at least one actuator, where the actuator is in communication with the vehicle and automatically deploys the deployable panel and the slide out panel under predetermined conditions and automatically retracts the deployable panel and the slide out panel when predetermined conditions for continued deployment are no longer met; and
a tailgate assembly with a depression formed in an inner panel for receiving the deployable panel such that the deployable panel lies flush with the inner panel of the tailgate assembly when in the stowed position.

15. A deployable bed cover system for a vehicle, comprising
at least one deployable panel, where said deployable panel selectively extends and retracts between a stowed position and a deployed position, where the deployment of the deployable panel improves aerodynamics, and where in the stowed position the deployable panel is flush within a tailgate assembly and/or cargo bed liner;
a slide out panel slidably connected to the at least one deployable panel to selectively slide inward and outward between a stowed position behind or within the at least one deployable panel and a deployed position extended from the at least one deployable panel when in the deployed position to further improve aerodynamics; and
at least one actuator, where the actuator is in communication with the vehicle and automatically deploys the deployable panel under a predetermined vehicle speed range and automatically retracts the deployable panel when said vehicle is under said predetermined vehicle speed range and/or when under higher predetermined loads.

* * * * *